United States Patent
Ness et al.

(10) Patent No.: US 8,651,282 B2
(45) Date of Patent: Feb. 18, 2014

(54) APPARATUS AND METHOD OF SEPARATING AND CONCENTRATING ORGANIC AND/OR NON-ORGANIC MATERIAL

(75) Inventors: Mark A. Ness, Underwood, ND (US); Matthew P. Coughlin, Hibbing, MN (US)

(73) Assignee: Great River Energy, Maple Grove, MN (US)

( * ) Notice: Subject to any disclaimer, the term of this patent is extended or adjusted under 35 U.S.C. 154(b) by 593 days.

(21) Appl. No.: 11/649,685

(22) Filed: Jan. 4, 2007

(65) Prior Publication Data

US 2007/0193926 A1 Aug. 23, 2007

Related U.S. Application Data

(63) Continuation of application No. 11/107,153, filed on Apr. 15, 2005, now Pat. No. 7,275,644.

(60) Provisional application No. 60/618,379, filed on Oct. 12, 2004.

(51) Int. Cl.
 *B07B 11/00* (2006.01)
(52) U.S. Cl.
 USPC .......................... 209/488; 209/490; 209/493
(58) Field of Classification Search
 USPC ............ 209/11, 474, 477, 488, 490, 493, 483
 See application file for complete search history.

(56) References Cited

U.S. PATENT DOCUMENTS

| | | | | |
|---|---|---|---|---|
| 2,101,295 A | * | 12/1937 | Rusk | 209/466 |
| 2,303,367 A | * | 12/1942 | Kendall et al. | 209/44 |
| 2,512,422 A | | 6/1950 | Fletcher et al. | |
| 2,586,818 A | | 2/1952 | Harms | |
| 2,600,425 A | | 6/1952 | Parry | |
| 2,671,968 A | | 3/1954 | Criner | |
| 2,932,395 A | | 4/1960 | Marot | |
| 3,007,577 A | | 11/1961 | Putman | |

(Continued)

FOREIGN PATENT DOCUMENTS

| | | | | |
|---|---|---|---|---|
| DE | 67 770 | | 7/1969 | |
| DE | 22 50 000 | | 4/1974 | ............. B03B 11/00 |

(Continued)

OTHER PUBLICATIONS

Weiss H J et al, "Trocknung Von Braunkohle in Der Dampf-Wirbelschicht", VGB Kraftwekstechnik, vol. 71, No. 7, Jul. 1, 1991, pp. 664-668.

(Continued)

*Primary Examiner* — Joseph C Rodriguez

(74) *Attorney, Agent, or Firm* — Moss & Barnett

(57) ABSTRACT

An apparatus for segregating particulate by density and/or size including a fluidizing bed having a particulate receiving inlet for receiving particulate to be fluidized. The fluidized bed also includes an opening for receiving a first fluidizing stream, an exit for fluidized particulate and at least one exit for non-fluidized particulate. A conveyor is operatively disposed in the fluidized bed for conveying the non-fluidized particulate to the non-fluidized particulate exit. A collector box is in operative communication with the fluidized bed to receive the non-fluidized particulate. There is a means for directing a second fluidizing stream through the non-fluidized particulate as while it is in the collector box to separate fluidizable particulate therefrom.

33 Claims, 13 Drawing Sheets

(56) References Cited

U.S. PATENT DOCUMENTS

| | | | |
|---|---|---|---|
| 3,090,131 | A | 5/1963 | Waterman, Jr. |
| 3,140,862 | A | 7/1964 | Schoppe |
| 3,238,634 | A | 3/1966 | Groins |
| 3,246,750 | A | 4/1966 | Chase et al. |
| 3,262,214 | A | 7/1966 | Webb |
| 3,331,754 | A | 7/1967 | Mansfield |
| 3,409,131 | A | 11/1968 | Alfred et al. |
| 3,434,932 | A | 3/1969 | Mansfield |
| 3,471,016 | A | 10/1969 | Everson et al. |
| 3,539,001 | A | 11/1970 | Binnex et al. |
| 3,654,705 | A | 4/1972 | Smith et al. |
| 3,687,431 | A | 8/1972 | Parks |
| 3,687,743 | A | 8/1972 | Parks |
| 3,721,014 | A | 3/1973 | Voelskow |
| 3,728,230 | A | 4/1973 | Kemmetmueller |
| 3,734,289 | A | 5/1973 | Pearman |
| 3,744,145 | A | 7/1973 | Maxwell et al. |
| 3,774,759 | A * | 11/1973 | Weintraub et al. ............ 209/474 |
| 3,800,427 | A | 4/1974 | Kemmetmueller |
| 3,842,461 | A | 10/1974 | Wurster |
| 3,852,168 | A | 12/1974 | Oetiker |
| 3,856,441 | A | 12/1974 | Suzukawa et al. |
| 3,959,084 | A | 5/1976 | Price |
| 3,960,513 | A | 6/1976 | Agarwal et al. |
| 3,968,052 | A | 7/1976 | Seglin et al. |
| 3,985,516 | A | 10/1976 | Johnson |
| 4,028,228 | A | 6/1977 | Ferris et al. |
| 4,030,895 | A | 6/1977 | Caughey |
| 4,052,168 | A | 10/1977 | Koppelman |
| 4,053,364 | A | 10/1977 | Poersch et al. |
| 4,073,481 | A | 2/1978 | Lawson et al. |
| 4,100,033 | A | 7/1978 | Holter |
| 4,126,519 | A | 11/1978 | Murray |
| 4,152,843 | A | 5/1979 | Kemmetmueller |
| 4,155,313 | A | 5/1979 | Moss |
| 4,174,946 | A | 11/1979 | Rohde |
| 4,176,011 | A | 11/1979 | Knappstein |
| 4,192,650 | A | 3/1980 | Seitzer |
| 4,196,676 | A | 4/1980 | Brown et al. |
| 4,201,541 | A | 5/1980 | Schoppe |
| 4,230,559 | A | 10/1980 | Smith |
| 4,236,318 | A | 12/1980 | Heard et al. |
| 4,240,877 | A | 12/1980 | Stahlherm et al. |
| 4,245,395 | A | 1/1981 | Potter |
| 4,253,821 | A | 3/1981 | Bradshaw |
| 4,253,825 | A | 3/1981 | Fasano |
| 4,265,737 | A | 5/1981 | Smith et al. |
| 4,266,539 | A | 5/1981 | Parker et al. |
| 4,276,120 | A | 6/1981 | Lutz |
| 4,280,418 | A | 7/1981 | Erhard |
| 4,282,088 | A | 8/1981 | Ennis |
| 4,284,416 | A | 8/1981 | Nahas |
| 4,284,476 | A | 8/1981 | Wagener et al. |
| 4,292,742 | A | 10/1981 | Ekberg |
| 4,294,807 | A | 10/1981 | Randolph |
| 4,295,281 | A | 10/1981 | Potter |
| 4,299,694 | A | 11/1981 | Goodell |
| 4,300,291 | A | 11/1981 | Heard et al. |
| 4,308,102 | A | 12/1981 | Wagener et al. |
| 4,310,501 | A | 1/1982 | Reh et al. |
| 4,324,544 | A | 4/1982 | Blake |
| 4,330,946 | A | 5/1982 | Courneya |
| 4,331,445 | A | 5/1982 | Burns |
| 4,338,160 | A | 7/1982 | Dellessard et al. |
| 4,349,367 | A | 9/1982 | Krumwiede |
| 4,354,903 | A | 10/1982 | Weber et al. |
| 4,383,379 | A | 5/1983 | Avril |
| 4,389,794 | A | 6/1983 | Bitterly |
| 4,409,101 | A | 10/1983 | Salikhov et al. |
| 4,430,161 | A | 2/1984 | Petrovic et al. |
| 4,431,485 | A | 2/1984 | Petrovic et al. |
| 4,436,589 | A | 3/1984 | Petrovic et al. |
| 4,440,625 | A | 4/1984 | Go et al. |
| 4,444,129 | A | 4/1984 | Ladt |
| 4,449,483 | A | 5/1984 | Strohmeyer |
| 4,455,135 | A | 6/1984 | Bitterly |
| 4,468,288 | A | 8/1984 | Galow et al. |
| 4,470,878 | A | 9/1984 | Petrovic et al. |
| 4,481,724 | A | 11/1984 | Petrovic et al. |
| 4,492,040 | A | 1/1985 | Jensen et al. |
| 4,493,157 | A | 1/1985 | Wicker |
| 4,495,710 | A | 1/1985 | Ottoson |
| 4,506,608 | A | 3/1985 | Strohmeyer, Jr. |
| 4,523,388 | A | 6/1985 | Cuel |
| 4,530,700 | A | 7/1985 | Sawyer et al. |
| 4,533,438 | A | 8/1985 | Michael et al. |
| 4,567,674 | A | 2/1986 | Strohmeyer, Jr. |
| 4,571,174 | A | 2/1986 | Shelton |
| 4,574,744 | A | 3/1986 | Lorenz et al. |
| 4,575,418 | A | 3/1986 | Robbins |
| 4,583,301 | A | 4/1986 | Crowley et al. |
| 4,583,468 | A | 4/1986 | Reed et al. |
| 4,589,981 | A * | 5/1986 | Barari et al. ................ 209/474 |
| 4,606,793 | A | 8/1986 | Petrovic et al. |
| 4,617,744 | A | 10/1986 | Siddoway et al. |
| 4,619,732 | A | 10/1986 | Clay et al. |
| 4,627,173 | A | 12/1986 | O'Hagan et al. |
| 4,635,379 | A | 1/1987 | Kroneld |
| 4,635,380 | A | 1/1987 | Anderson |
| 4,640,873 | A | 2/1987 | Tajima |
| 4,644,664 | A | 2/1987 | Bradshaw |
| 4,655,436 | A | 4/1987 | Williams |
| 4,668,255 | A | 5/1987 | Govind |
| 4,705,533 | A | 11/1987 | Simmons |
| 4,725,337 | A | 2/1988 | Green |
| 4,736,711 | A | 4/1988 | Marlair et al. |
| 4,754,869 | A | 7/1988 | Hutchinson et al. |
| 4,760,650 | A | 8/1988 | Theliander et al. |
| 4,790,748 | A | 12/1988 | Litt et al. |
| 4,795,037 | A | 1/1989 | Rich, Jr. |
| 4,800,015 | A | 1/1989 | Simmons |
| 4,809,537 | A | 3/1989 | Glover et al. |
| 4,810,258 | A | 3/1989 | Greene |
| 4,822,383 | A | 4/1989 | Brose et al. |
| 4,842,695 | A | 6/1989 | Schmid et al. |
| 4,852,384 | A | 8/1989 | Woolbert et al. |
| 4,882,274 | A | 11/1989 | Pyne, Jr. et al. |
| 4,888,885 | A | 12/1989 | Caughey |
| 4,908,124 | A | 3/1990 | Goldbach et al. |
| 4,945,656 | A | 8/1990 | Judd |
| 4,950,388 | A | 8/1990 | Stafford |
| 4,957,049 | A | 9/1990 | Strohmeyer, Jr. |
| 4,975,257 | A | 12/1990 | Lin |
| 5,024,681 | A | 6/1991 | Chang |
| 5,024,770 | A * | 6/1991 | Boyd et al. ................ 210/747 |
| 5,033,208 | A | 7/1991 | Ohno et al. |
| 5,035,721 | A | 7/1991 | Atherton |
| 5,046,265 | A | 9/1991 | Kalb |
| 5,087,269 | A * | 2/1992 | Cha et al. ................ 44/626 |
| 5,087,351 | A | 2/1992 | Vallentine, Sr. |
| 5,103,743 | A | 4/1992 | Berg |
| 5,120,431 | A | 6/1992 | Cordonnier |
| 5,132,007 | A | 7/1992 | Meyer et al. |
| 5,137,539 | A | 8/1992 | Bowling |
| 5,137,545 | A | 8/1992 | Walker |
| 5,145,489 | A | 9/1992 | Dunlap |
| 5,146,857 | A | 9/1992 | Spliethoff et al. |
| 5,158,580 | A | 10/1992 | Chang |
| 5,171,406 | A | 12/1992 | Shang et al. |
| 5,192,398 | A | 3/1993 | Kress et al. |
| 5,197,398 | A | 3/1993 | Levy et al. |
| 5,223,088 | A | 6/1993 | Hansen |
| 5,244,099 | A * | 9/1993 | Zaltzman et al. ............ 209/466 |
| 5,248,387 | A | 9/1993 | Hansen |
| 5,283,959 | A | 2/1994 | Nagayoshi et al. |
| 5,285,581 | A | 2/1994 | Walker |
| 5,289,920 | A * | 3/1994 | Godderidge et al. ............ 209/2 |
| 5,291,668 | A | 3/1994 | Becker et al. |
| 5,299,694 | A | 4/1994 | Rambaud |
| 5,322,530 | A | 6/1994 | Merriam et al. |
| 5,327,717 | A | 7/1994 | Hauk |
| 5,361,513 | A | 11/1994 | Woessner |
| 5,372,791 | A | 12/1994 | Abdulally |
| 5,373,648 | A | 12/1994 | Wolf |

(56) References Cited

U.S. PATENT DOCUMENTS

| | | |
|---|---|---|
| 5,399,194 A | 3/1995 | Cochran et al. |
| 5,403,365 A | 4/1995 | Merriam et al. |
| 5,426,932 A | 6/1995 | Morihara et al. |
| 5,430,270 A | 7/1995 | Findlan et al. |
| 5,471,955 A | 12/1995 | Dietz |
| 5,491,969 A | 2/1996 | Cohn et al. |
| 5,501,162 A | 3/1996 | Kravets |
| 5,503,646 A | 4/1996 | McKenney et al. |
| 5,527,365 A | 6/1996 | Colemann et al. |
| 5,534,137 A | 7/1996 | Griggs et al. |
| 5,537,941 A | 7/1996 | Goldich |
| 5,546,875 A | 8/1996 | Selle et al. |
| 5,547,549 A | 8/1996 | Fracas |
| 5,601,703 A | 2/1997 | Szymocha et al. |
| 5,637,336 A | 6/1997 | Kannenberg et al. |
| 5,683,494 A | 11/1997 | Altman et al. |
| 5,735,061 A | 4/1998 | Lawrence |
| 5,795,484 A | 8/1998 | Greenwald, Sr. |
| 5,827,352 A | 10/1998 | Altman et al. |
| 5,830,246 A | 11/1998 | Dunlop |
| 5,830,247 A | 11/1998 | Dunlop |
| 5,832,848 A | 11/1998 | Reynoldson et al. |
| 5,853,548 A | 12/1998 | Piskorz et al. |
| 5,858,035 A | 1/1999 | Dunlop |
| 5,867,921 A | 2/1999 | Maruyama et al. |
| 5,869,810 A | 2/1999 | Reynolds et al. |
| 5,904,741 A | 5/1999 | Dunlop et al. |
| 5,948,143 A | 9/1999 | Sjostrom et al. |
| 5,961,693 A | 10/1999 | Altman et al. |
| 5,996,808 A | 12/1999 | Levy et al. |
| 6,065,224 A | 5/2000 | Eigner |
| 6,085,912 A | 7/2000 | Hacking, Jr. et al. |
| 6,096,118 A | 8/2000 | Altman et al. |
| 6,148,599 A | 11/2000 | McIntosh et al. |
| 6,151,799 A | 11/2000 | Jones |
| 6,162,265 A | 12/2000 | Dunlop et al. |
| 6,249,988 B1 | 6/2001 | Duske et al. |
| 6,298,579 B1 | 10/2001 | Ichitani et al. |
| 6,302,945 B1 | 10/2001 | Altman et al. |
| 6,355,094 B1 | 3/2002 | Schomaker et al. |
| 6,422,392 B1 | 7/2002 | Levy |
| 6,447,559 B1 | 9/2002 | Hunt |
| 6,488,740 B1 | 12/2002 | Patel et al. |
| 6,500,241 B2 | 12/2002 | Reddy |
| 6,536,133 B1 | 3/2003 | Snaper |
| 6,547,854 B1 | 4/2003 | Gray et al. |
| 6,584,699 B2 | 7/2003 | Ronning et al. |
| 6,610,263 B2 | 8/2003 | Pahlman et al. |
| 6,712,878 B2 | 3/2004 | Chang et al. |
| 6,755,892 B2 | 6/2004 | Nalette et al. |
| 6,783,739 B2 | 8/2004 | Altman |
| 6,789,488 B2 | 9/2004 | Levy et al. |
| 6,799,097 B2 | 9/2004 | Villareal Antelo et al. |
| 6,880,263 B2 | 4/2005 | Gasparini et al. |
| 6,889,842 B2 * | 5/2005 | Sandlin et al. .................. 209/20 |
| 6,907,996 B1 | 6/2005 | Fraas |
| 6,912,889 B2 | 7/2005 | Stephanos et al. |
| 7,237,679 B1 | 7/2007 | Hendrickson et al. |
| 7,357,903 B2 | 4/2008 | Zhou et al. |
| 2002/0184787 A1 | 12/2002 | Ronning et al. |
| 2003/0000228 A1 | 1/2003 | Leuenberger et al. |
| 2003/0046826 A1 | 3/2003 | Snaper |
| 2004/0194337 A1 | 10/2004 | Gasparini et al. |
| 2006/0112588 A1 | 6/2006 | Ness et al. |
| 2007/0251120 A1 | 11/2007 | Connell |
| 2007/0256316 A1 | 11/2007 | Jordison et al. |
| 2008/0028631 A1 | 2/2008 | Leahy |
| 2008/0028634 A1 | 2/2008 | Leahy |
| 2008/0201980 A1 | 8/2008 | Bullinger |
| 2009/0249641 A1 | 10/2009 | Graham et al. |

FOREIGN PATENT DOCUMENTS

| | | | |
|---|---|---|---|
| DE | 31 25 629 | 2/1983 | ............... F23K 1/04 |
| DE | 40 03 499 | 8/1990 | ............... F23K 1/04 |
| DE | 41 05 128 | 8/1992 | ............... F23K 1/04 |
| DE | 43 23 469 | 1/1995 | ............... F23K 1/04 |
| DE | 19518644 | 5/1995 | ............... F22B 1/02 |
| DE | 195 10 006 | 9/1996 | ............ F22B 31/08 |
| DE | 199 31 346 | 12/2000 | ............. F01K 17/06 |
| GB | 2 327 442 | 1/1999 | ............. E21B 21/06 |
| JP | 56014578 | 2/1981 | ............. C10B 39/02 |
| JP | 62-215691 | 9/1987 | ..................... 34/359 |
| JP | 08 270355 | 10/1996 | ............. E21B 10/62 |
| JP | 11-267591 A | 10/1999 | ............... B07B 4/08 |

OTHER PUBLICATIONS

Klutz Von H-J et al, "Das WTA-Verfahren als Vortrocknungsstufe fur moderne Kraftwerkskonzepte auf Basis Braunkohle", VGB Kraftwerkstechnik, vol. 76, No. 3, Mar. 1, 1996, pp. 224-229.

Doell, Glenn "Dais-Analytic Corporation: An Energy Technology Company," (Mar. 22, 2001).

Bullinger, et al. "Coal Drying Improves Performance and Reduces Emissions," *27th International Technical Conference on Coal Utilization and Fuel Systems* (Clearwater, FL) (Mar. 4-7, 2002).

Sarunac, et al. "Coal Drying Improves Performance and Reduces Emissions," *EPRI Heat Rate Improvement Conference* (Birmingham, AL) (Jan. 2003).

Bullinger, Charles "Fuel Enhancement by Incremental Moisture Reduction," *18th International Low Rank Coal* (Jun. 25, 2003).

Ness, et al. "Pilot Coal Dryer Testing Summary," *TMRA Clean Coal Technology Workshop* (Feb. 5, 2004).

Ness, et al. "Pilot Fluidized Bed Coal Dryer: Operating Experience and Preliminary Results," *29th International Technical Conference on Coal Utilization & Fuel Systems* (Apr. 18-22, 2004).

Levy, et al. *Upgrading Low-Rank Coals Symposium* (May 2, 2004).

Ness, et al. "Pilot Fluidized Bed Coal Dryer: Operating Experience and Preliminary Results," *19th Western Fuels Symposium* (Billings, MT) (Oct. 12-14, 2004).

Sarunac, et al. "Impact of Coal Drying on Power Plant Efficiency, Operation and Emissions," *30th International Technical Conference on Coal Utilization and Fuel Systems* (Clearwater, FL) (Apr. 2005).

Sarunac, et al. "Comparison of Various Coal Drying Process Layouts and Their Impact on Plant Efficiency, Operation and Emissions," *30th International Technical Conference on Coal Utilization and Fuel Systems* (Clearwater, FL) (Apr. 2005).

Levy, et al. "The Impact of Coal Drying on Low Rank Coal Fired Power Plants," Lexington, KY *Conference* (May 2005).

Lehigh University "Performance and Emissions: Key Factors in Today's Competitive Energy Market" Bethlehem, PA *Conference* (May 25-26, 2005).

Merriam, Norman W. "Removal of Mercury from Powder River Basin Coal by Low-Temperature Thermal Treatment," *Report Under DOE CRADA Filed by Western Research Institute* (Jul. 1993).

James, Dennis R. "Lignite Fuel Enhancement: Incremental Reduction Project (Phase I) Revision I," *1st NDIC Grant Application* (Feb. 14, 2000).

Dr. Moen, et al. "Lignite Coal Dryer Project (for Great River Energy, Coal Creek Station)," *Report* (May 12, 2000).

James, Dennis R. "Lignite Fuel Enhancement: Incremental Reduction Project (Phase I)," *Status Report* No. 2 (Aug. 10, 2000).

Bullinger, Charlie "Lignite Fuel Enhancement (Maximizing the Value (i.e., Lowest Cost of Electricity Produced and Reduced Emissions) of Lignite Fuel Through Incremental Moisture Reduction," *DOE Project Proposal* (Apr. 19, 2001).

Bullinger, Charlie "Lignite Fuel Enhancement: (Significantly Enhancing the Value of U.S. Lignite Fuel Its Abundant, Low-Cost and Environmentally Responsible)," *DOE Project Proposal* (Apr. 19, 2001).

Scheffknecht, Gunter "Technologies for Efficient Utilization of Low-Rank Fuels," (May 17-18, 2001).

James, Dennis R. "Lignite Fuel Enhancement: Incremental Moisture Reduction," *Final Report for Phase 1* (Dec. 14, 2001).

(56) References Cited

OTHER PUBLICATIONS

Kakaras, et al. "Computer Simulation Studies for the Integration of an External Dryer into a Greek Lignite-Fired Power Plant," 81 *Fuel* 583-93 (2002).
Kravetse, A. "Enhanced Rankine Cycle-Significant Reduction in NOx Emissions and Heat Rate in Both Existing and New Coal Fired Power Plants" (Unknown).
Bullinger, Charlie "Lignite Fuel Enhancement" *Project Proposal* (Jul. 31, 2002).
"Research Demonstrates Benefits of Drying Western Coal," *Lehigh Energy Update*, vol. 20(2) (Aug. 2002).
"Increasing Power Plant Efficiency-Lignite Fuel Enhancement," *DOE Project Facts Website* (May 20, 2003).
Levy, Edward K. "Use of Coal Drying to Reduce Water Consumed in Pulverized Coal Power Plants," *First Quarterly Report to DOE* (Mar. 2003).
Ness, Mark "Lignite Fuel Enhancement: Incremental Moisture Reduction Program Phase II Oct. 2003 Status Report," (Oct. 24, 2003).
Feeley et al. "Innovative Approaches and Technologies for Improved Power Plant Water Management," *U.S. DOE Program Facts* (Jan. 1, 2004).
Levy, et al. "Use of Coal Drying to Reduce Water Consumed in Pulverized Coal Power Plants," *Fourth Quarterly Report to DOE* (Jan. 1, 2004).
Levy, Edward "Performance Evaluation of Coal Creek Pilot Dryer," *Prepared for Mark Ness of GRE for Coal Creek Station* (Feb. 6, 2004).
Thwing, Theo "Lehigh Research Aids Power Plants," *The Brown and White* (*Lehigh Student Newspaper*) (Feb. 8, 2004).
Ness, Mark "Lignite Fuel Enhancement: Incremental Moisture Reduction Program Phase II Feb. 2004 Status Report," (Feb. 29, 2004).
Levy, et al. "Use of Coal Drying to Reduce Water Consumed in Pulverized Coal Power Plants," *Fifth Quarterly Report to DOE* (Apr. 1, 2004).
Levy, et al. "Separation of Ash From Lignite in a Bubbling Fluidized Bed," *Presented for Mark Ness of GRE for Coal Creek Station* (Apr. 23, 2004).
Levy, et al. "Use of Coal Drying to Reduce Water Consumed in Pulverized Coal Power Plants," *Sixth Quarterly Report to DOE* (Jul. 1, 2004).
Guffey, et al. "Thermal Pretreatment of Low-Ranked Coal for Control of Mercury Emissions," 85 *Fuel Processing Technology* 521-31 (2004).
Weinstein, et al. "Lignite Fuel Enhancement: Incremental Moisture Reduction," *Memorandum*.
Levy, et al. "Use of Coal Drying to Reduce Water Consumed in Pulverized Coal Power Plants," *Seventh Quarterly Report to DOE* (Oct. 2004).
Ness, Mark "Pilot Fluidized Bed Coal Dryer: Test 48, 49, 50, 52, 57, 58, and 59 Results," (Dec. 26, 2004).
Dubrovich, Matthew "Ash Separation From Lignite Using a Bubbling Fluidized Bed," *Thesis Paper Presented to the Graduate and Research Committee of Lehigh University* (Jan. 21, 2005).
Ness, Mark "Lignite Fuel Enhancement: Incremental Moisture Reduction Program Phase II Mar. 2005 Final Report," *Report to NDIC* (Mar. 31, 2005).
Armor, Tony "Interest Group on Drying of Wet Fuels Using Waste Heat," (Unknown).
Niro, Inc., "Fluid Bed Processing Systems," http://www.niroinc.com/html/drying/fluidbed.html (Unknown).
Niro, Inc., "Particulate Processing: Fluid Bed Processors," http://niroinc.com/html/drying/fluidbed.html (2001).

* cited by examiner

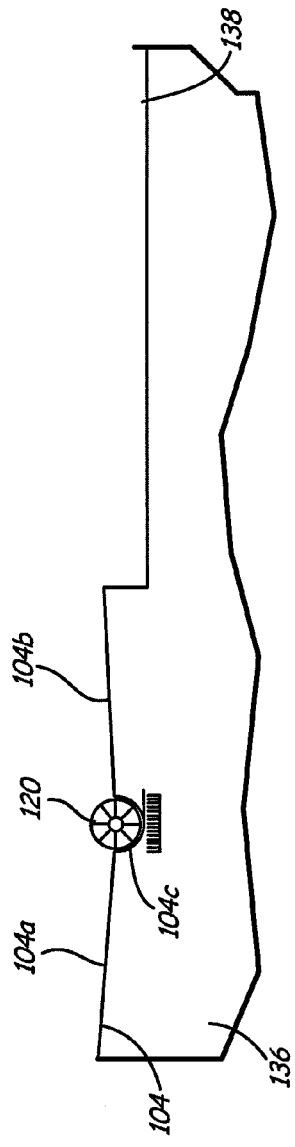
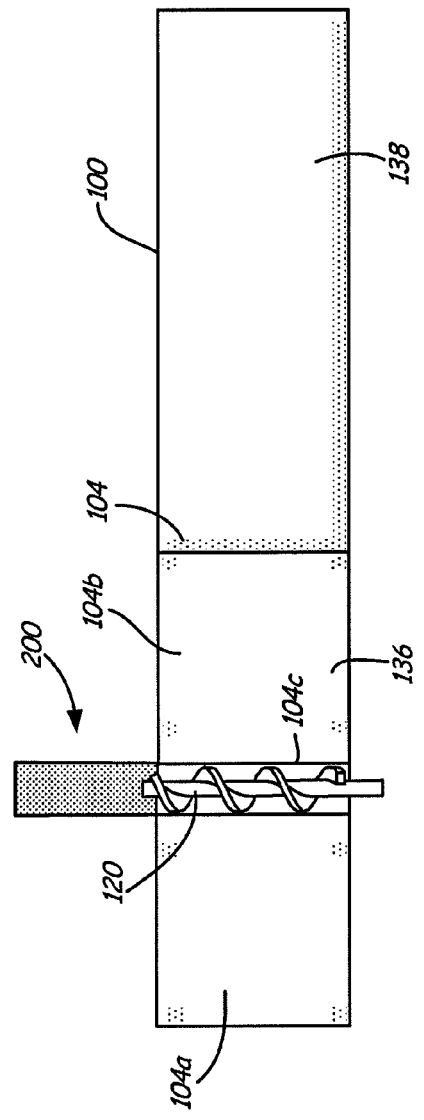
FIG. 4B
FIG. 4C

APPARATUS AND METHOD OF SEPARATING AND CONCENTRATING ORGANIC AND/OR NON-ORGANIC MATERIAL

CROSS-REFERENCE TO RELATED APPLICATION

This application is a continuation of U.S. patent application Ser. No. 11/107,153 filed on Apr. 15, 2005 now U.S. Pat. No. 7,275,644, which claims the benefit of U.S. provisional application Ser. No. 60/618,379 filed on Oct. 12, 2004, which are hereby incorporated in their entirety by reference.

FIELD OF THE INVENTION

This invention relates to an apparatus for and method of separating particulate material from denser and/or larger material containing contaminants or other undesirable constituents, while concentrating the denser and/or larger material for removal and further processing or disposal. More specifically, the invention utilizes a scrubber assembly in operative communication with a fluidized bed that is used to process coal or another organic material in such a manner that the denser and/or larger material containing contaminates or other undesirable constituent is separated from the rest of the coal or other organic material.

BACKGROUND OF THE INVENTION

About 63% of the world's electric power and 70% of the electric power produced in the United States is generated from the burning of fossil fuels like coal, oil, or natural gas at electric power plants. Such fuel is burned in a combustion chamber at the power plant to produce heat used to convert water in a boiler to steam. This steam is then superheated and introduced to huge steam turbines whereupon it pushes against the fanlike blades of the turbine to rotate a shaft. This spinning shaft, in turn, turns the rotor of an electric generator to produce electricity.

Eighty-nine percent of the coal mined in the United States is used as the heat source for electric power plants. Unlike petroleum and natural gas, the available supplies of coal that can be economically extracted from the earth are plentiful. Bituminous coals have been the most widely used rank of coal for electric power production because of their abundance and relatively high heating values. However, they also contain medium to high levels of sulfur. As a result of increasingly stringent environmental regulations like the Clean Air Act in the U.S., electric power plants have had to install costly scrubber devices in the smokestacks of these plants to prevent the sulfur dioxide ("$SO_2$"), nitrous oxides ("$NO_x$"), and fly ash that result from burning these coals to pollute the air.

Lower rank coals like subbituminous and lignite coals have gained increasing attention as heat sources for power plants because of their low sulfur content. However, they still produce sufficient levels of $SO_2$, $NO_x$, and fly ash when burned such that treatment of the flue gas is required to comply with federal and state pollution standards. Additionally, ash and sulfur are the chief impurities appearing in coal. The ash consists principally of mineral compounds of aluminum, calcium, iron, and silicon. Some of the sulfur in coal is also in the form of minerals—particularly pyrite, which is a compound of iron and sulfur. The remainder of the sulfur in coal is in the form of organic sulfur, which is closely combined with the carbon in the coal.

Coal mining companies typically clean their coal products to remove impurities before supplying them to end users like electric power plants and coking production plants. After sorting the pieces of coal by means of a screening device to form coarse, medium, and fine streams, these three coal streams are delivered to washing devices in which the coal particles are mixed with water. Using the principle of specific gravity, the heaviest pieces containing the largest amounts of impurities settle to the bottom of the washer, whereupon they drop into a refuse bin for subsequent disposal. The cleaned coal particles from the three streams are then combined together again and dried by means of vibrators, jigs, or hot-air blowers to produce the final coal product ready for shipment to the end user.

While the cleaning process employed by coal mining operations removes much of the ash from the coal, it has little effect on sulfur, since the organic sulfur is closely bound to the carbon within the coal. Thus, other methods can be used to further purify the coal prior to its combustion. For example, the coal particles may be fed into a large machine, wherein they are subjected to vibration and pulsated air currents. U.S. Pat. No. 3,852,168 issued to Oetiker discloses such a method and apparatus for separating corn kernels from husk parts. U.S. Pat. No. 5,244,099 issued to Zaltzman et al. on the other hand teaches the delivery of granular materials through an upwardly inclined trough through which a fluidizing gas is forced from the bottom of the trough to create a fluidized material bed. A vertical oscillatory motion is also imparted to the trough to assist in the separation of the various components contained in the material mixture. Less dense components of the mixture rise to the surface of the fluidized bed, while the denser components settle to the bottom. At the output end of the trough, a stream splitter can be used to recover different layers of materials. This apparatus is good for separating agricultural products and sand.

It is known in the prior art that under some circumstances a fluidized bed may be used without the addition of mechanical vibration or vertical oscillation to achieve particle separation. For example, U.S. Pat. No. 4,449,483 issued to Strohmeyer uses a heated fluidized bed dryer to treat municipal trash and remove heavier particles like glass from the trash before its combustion to produce heat. Meanwhile, U.S. Pat. No. 3,539,001 issued to Binnix et al. classifies materials from an admixture by means of intermediate selective removal of materials of predetermined sizes and specific gravities. The material mixture travels along a downwardly sloped screen support and is suspended by upwardly directed pneumatic pulses. U.S. Pat. No. 2,512,422 issued to Fletcher et al. again uses a downwardly inclined fluidized bed with upwardly directed pulses of air, wherein small particles of coal can be separated and purified from a coal mixture by providing holes in the top of the fluidized bed unit of a sufficient cross sectional area relative to the total cross sectional area of the bed to control the static pressure level within the fluidized bed to prevent the small particles of higher specific gravity from rising within the coal bed.

The process and devices disclosed in these Strohmeyer, Binnix, and Fletcher patents, however, all seem to be directed to the separation of different constituents within an admixture having a relatively large difference in specific gravity. Such processes may work readily to separate nuts, bolts, rocks, etc. from coal, however, they would not be expected to separate coal particles containing organic sulfur from coal particles largely free of sulfur since the specific gravities of these two coal fractions can be relatively close.

Another air pollutant of great concern is mercury, which occurs naturally in coal. Regulations promulgated by the U.S. Environmental Protection Agency ("EPA") require coal-fired power plants to dramatically reduce the mercury levels contained in their flue gases by 2010. Major efforts within the industry have focused upon the removal of mercury from the flue gas by the use of carbon-based sorbents or optimization of existing flue gas emissions control technologies to capture the mercury. However, utilization of carbon sorben-based scrubber devices can be very expensive to install and operate. Moreover, currently existing emissions control equipment can work less well for high-rank coals (anthracite and bituminous) vs. low-rank coals (subbitumionous and lignite).

Western Research Institute has therefore developed and patented a pre-combustion thermal process for treating low-rank coals to remove the mercury. Using a two-zone reactor, the raw coal is heated in the first zone at approximately 300° F. to remove moisture which is purged from the zone with a sweep gas. The dried coal is then transferred to a second zone where the temperature is raised to approximately 550° F. Up to 70-80% of the mercury contained in the coal is volatilized and swept from the zone with a second sweep gas stream. The mercury is subsequently separated from the sweep gas and collected for disposal. See Guffey, F. D. & Bland, A. E., "Thermal Pretreatment of Low-Ranked Coal for Control of Mercury Emissions," 85 *Fuel Processing Technology* 521-31 (2004); Merriam, N. W., "Removal of Mercury from Powder River Basin. Coal by Low-Temperature Thermal Treatment," Topical Report WRI-93-R021 (1993); U.S. Pat. No. 5,403,365 issued to Merriam et al.

However, this pre-combustion thermal pretreatment process is still capital intensive in that it requires a dual zone reactor to effectuate the drying and mercury volatilization steps. Moreover, an energy source is required to produce the 550° F. bed temperature. Furthermore, 20-30% of the mercury cannot be removed from the coal by this process, because it is tightly bound to the carbon contained in the coal. Thus, the expensive scrubber technology will still be required to treat flue gas resulting from combustion of coal pretreated by this method because of the appreciable levels of mercury remaining in the coal after completion of this thermal pretreatment process.

Therefore, the ability to pre-treat particulate material like coal with fluidized bed operated at very low temperature without mechanical or chemical additives in order to separate and remove most of the pollutant constituents within the coal (e.g., mercury and sulfur) would be desirable. Such a process could be applied to all ranks of coals, and would alleviate the need for expensive scrubber technology for treatment flue gases after combustion of the coal.

SUMMARY OF THE INVENTION

The present invention includes an apparatus for segregating particulate by density and/or size. The apparatus includes a fluidizing bed having a particulate receiving inlet for receiving the particulate to be fluidized. The fluidized bed also includes an opening for receiving a first fluidizing stream, which can be a primary heat stream, a secondary heat stream, at least one waste stream, or any combination thereof. At least one exit from the fluidized bed is provided for the fluidized particulate as well as at least one exit for the non-fluidized particulate. A conveyor is operatively disposed in the fluidized bed for conveying the non-fluidized particulate to the non-fluidized particulate exit. A collector box is in operative communication with the fluidized bed to receive the non-fluidized particulate. There is also a means for directing a second fluidizing stream through the non-fluidized particulate while it is in the collector box to in order to further separate fluidizable particulate there from.

One advantage of the present invention is that it permits generally continuous processing of the particulate. As the non-fluidized particulate is conveyed from the fluidized bed to the collector box more particulate can be added for processing.

Another advantage of the present invention is a generally horizontal conveyance of the non-particulate. The generally horizontal conveyance of the non-fluidized particulate ensures that all of the particulate is processed evenly and quickly by mixing or churning the material while it is being conveyed.

Still yet another advantage of the present invention is that it includes a second fluidizing step or apparatus to capture more non-contaminated fluidizable particulates that are still trapped, or have become trapped, in the non-fluidized particulate. Capturing more of the fluidized particulate increases the amount of usable non-contaminated particulates, while reducing the amount of contaminated particulates that will be subject to further processing or disposal. By capturing more of the usable non-contaminated particulates and reducing the amount of contaminated particulate a company is able to increase its efficiency while reducing its costs.

BRIEF DESCRIPTION OF THE DRAWINGS

In the accompanying drawings:

FIG. 4B is a cross section view of a two-staged fluidized bed according to an example embodiment of the present invention.

FIG. 4C is a top cross section view of a two-staged fluidized bed and a scrubber assembly according to an example embodiment of the present invention.

The foregoing summary and are provided for example purposes only and are amenable to various modifications and arrangements that fall within the spirit and scope of the present invention. Therefore, the figures should not be considered limiting, but rather as a supplement to aid one skilled in the art to understand the novel concepts that are included in the following detailed description.

DETAILED DESCRIPTION OF THE PREFERRED EMBODIMENT

The invention includes an apparatus for, and a method of, separating particulate from denser and/or larger particulate containing contaminants or other undesirable constituents, while concentrating the denser and/or larger material and contaminants for removal and/or further processing. The method of separation utilized in the present invention capitalizes on the physical characteristics of the contaminants. In particular, it capitalizes on the difference between the specific gravity of contaminated and non-contaminated material. The contaminants can be removed from a majority of the material by separating and removing the denser and/or larger material. The present invention uses a fluidization method of separating the contaminated denser and/or larger material from the non-contaminated material.

Although the present invention may be used in a variety of applications such as in farming, and/or manufacturing, the following discussion will describe its use in power plants that utilize fluidized dry beds to dry coal. A concurrently filed application with having common inventors entitled Method of Enhancing the Quality of High-Moisture Materials Using System Heat Sources describes an example embodiment of drying coal in a fluidized dryer bed with waste heat. The concurrently filed application, which is hereby incorporated by reference in its entirety, will be briefly discussed to provide the reader with a general background of the potential uses for the present invention.

Figure 1:
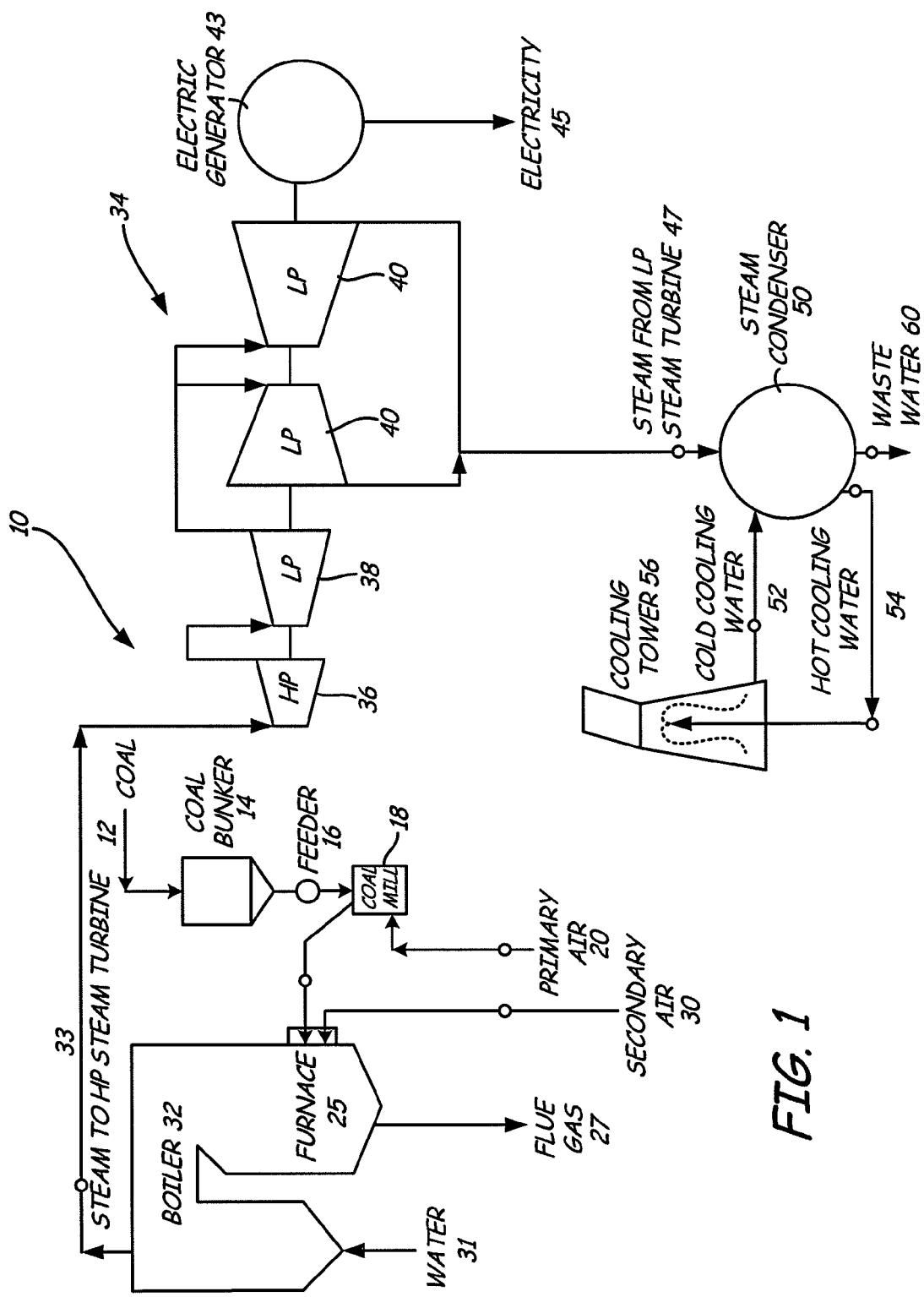
FIG. 1 is a schematic diagram of a typical coal-fired power plant that utilizes heat streams to dry coal.

FIG. 1 shows a simplified coal-fired electric power plant 10 for the generation of electricity. Raw coal 12 is collected in a coal bunker 14 and is then fed by means of feeder 16 to a coal mill 18 in which it is pulverized to an appropriate or predetermined particle size as is known in the art with the assistance of primary air stream 20. The pulverized coal particles are then fed to furnace 25 in which they are combusted in conjunction with secondary air stream 30 to produce a heat source. Flue gas 27 is also produced by the combustion reaction. The flue gas 27 is subsequently transported to the stack via environmental equipment. The heat source from the furnace, in turn, converts water 31 in boiler 32 into steam 33, which is delivered to steam turbine 34 operatively coupled to a generator that rotates and generates electricity.

Once steam 47 leaves steam turbines 40 it is delivered to condenser 50 in which it is cooled by means of cooling water 52. The cooling water 52 converts the steam 47 into water. The latent heat contained within steam 47 will increase the temperature of cold cooling water 52 which is typically considered waste heat and is discharged into a pond or lake.

Figure 3:
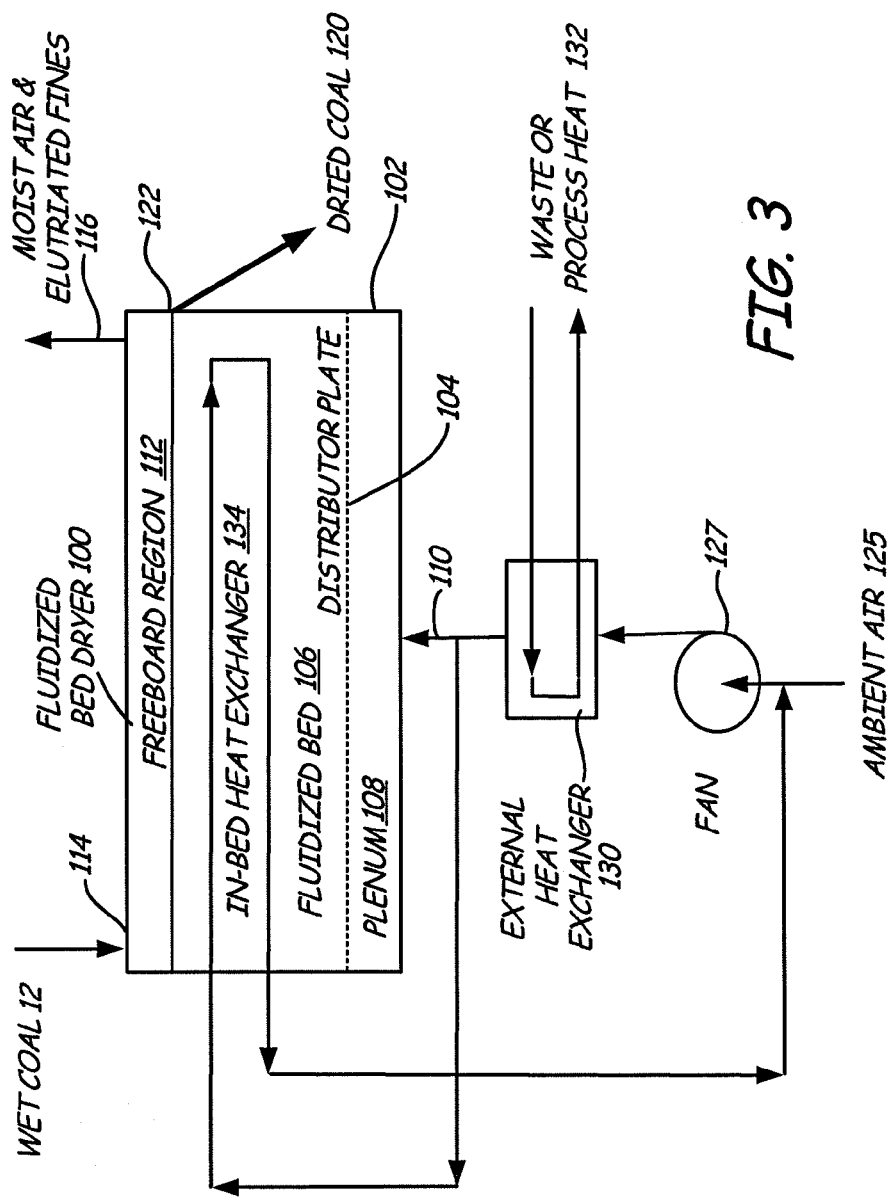
FIG. 3 is a schematic diagram of a single staged fluidized bed according to an example embodiment of the present invention.
Figure 5:
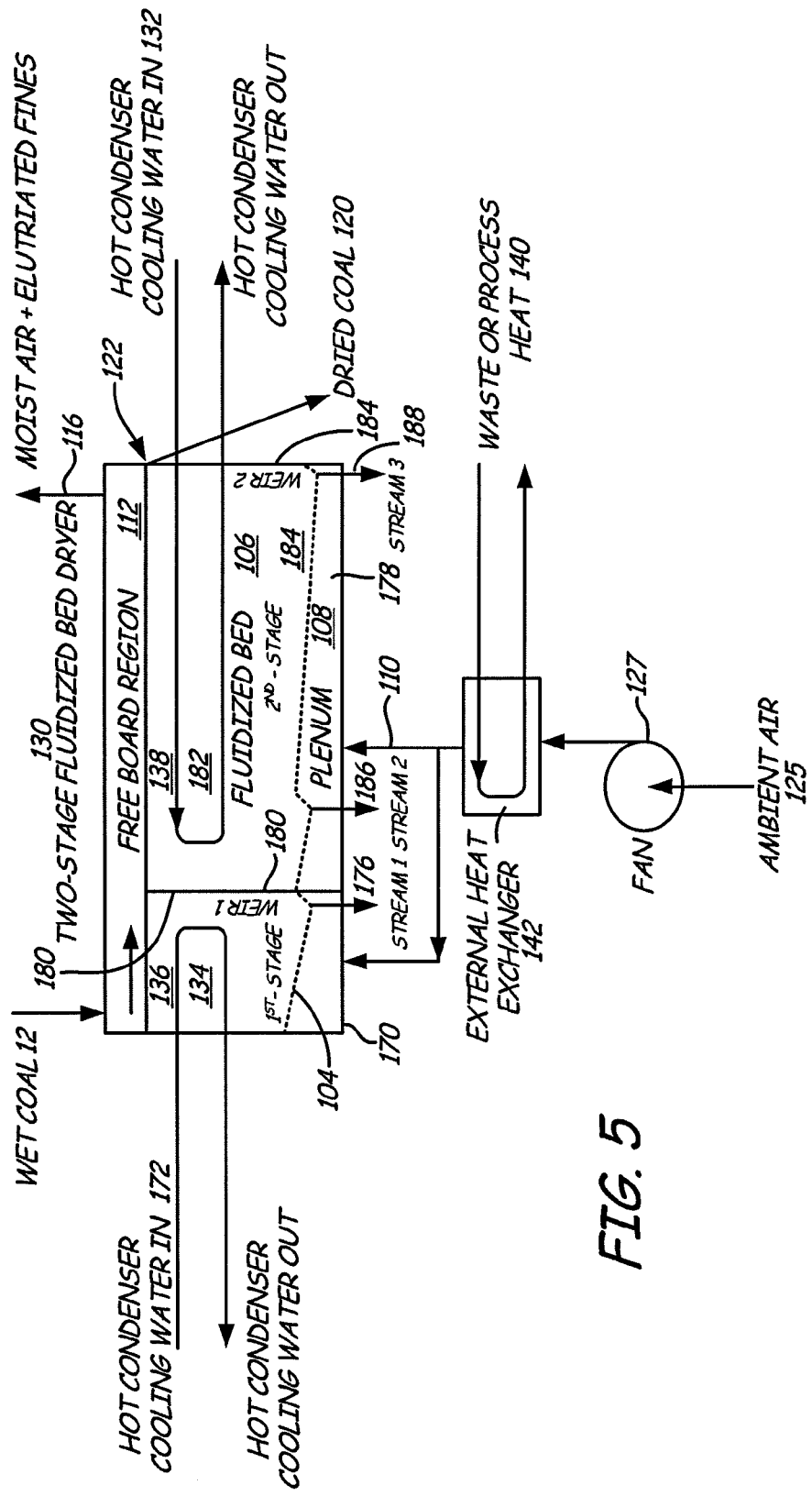
FIG. 5 is a schematic flow diagram of a two-staged fluidized bed according to another example embodiment of the present invention.

The operational efficiency of the electric power plant 10 of FIG. 1 may be enhanced by extracting and utilizing some of the waste heat and byproduct streams of the electricity power plant, as illustrated in FIGS. 3 and 5. It would further benefit the operational efficiency of the electric generating plant if the moisture level of coal 12 could be reduced prior to its delivery to furnace 25. Such a preliminary drying process could also enable the use of lower-rank coals like subbituminous and lignite coals on an economic basis.

Figure 2:
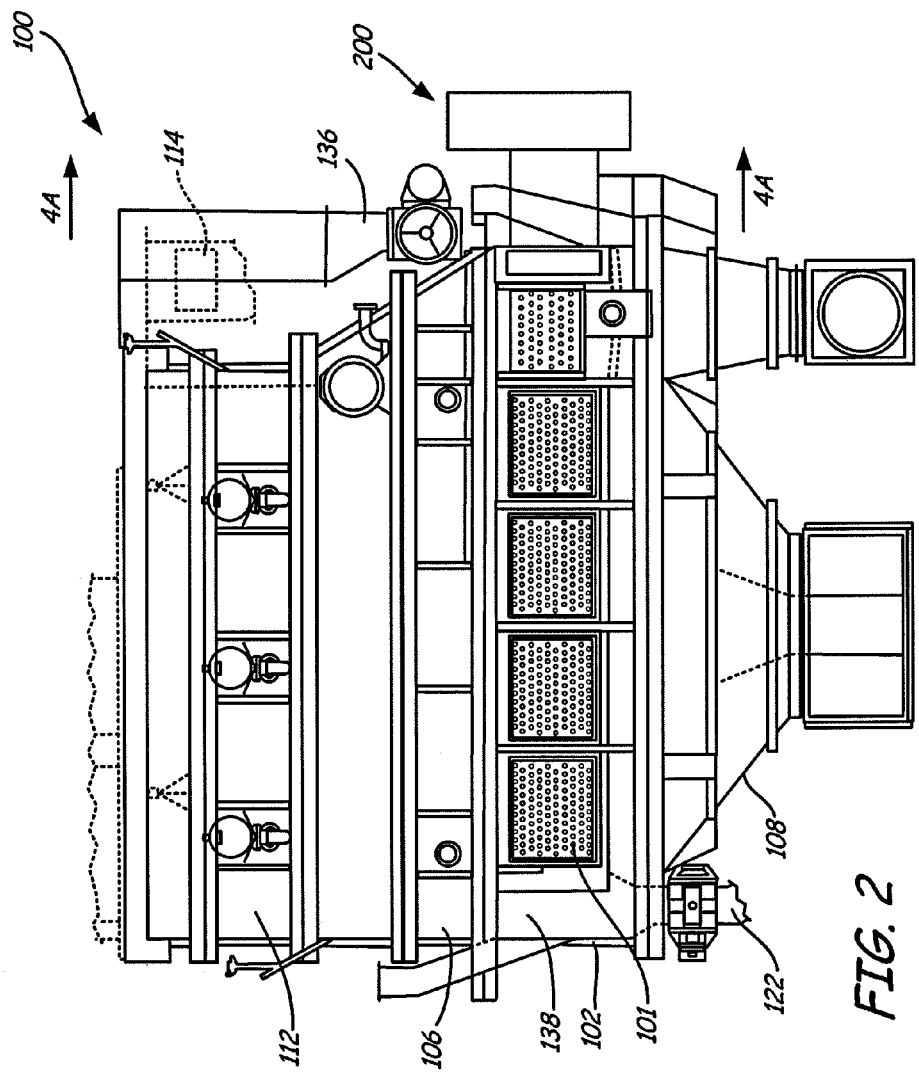
FIG. 2 is an end view of a two-staged fluidized bed according to an example embodiment of the present invention.

FIG. 2 shows a fluidized bed dryer 100 used for purposes of reducing the moisture content of coal 12, although it should be understood that any other type of dryer may be used within the context of this invention. Moreover, the entire coal drying system may consist of multiple coal dryers connected in series or parallel to remove moisture from the coal. A multi-dryer approach, involving a number of identical coal drying units, provides operating and maintenance flexibility and, because of its generally smaller size requirements, allows coal dryers to be installed and integrated within existing power plant equipment, as well as in stages, one at a time. This will minimize interference with normal plant operations.

The fluidized bed(s) 100 will operate in open air at relatively low-temperature ranges. An in-bed heat exchanger 101 will be used in conjunction with a fluidized-bed 100 design to provide additional heat for coal drying and, thus, reduce the necessary equipment size. With a sufficient in-bed heat transfer surface in a fluidized bed dryer 100, the fluidizing/drying air stream can be reduced to values corresponding to the minimum fluidization velocity. This will reduce erosion damage to and elutriation rate for the dryer.

Heat for the in-bed heat exchanger 101 can be supplied either directly or indirectly. A direct heat supply involves diverting a portion of hot fluidizing air stream, hot condenser cooling water, process steam, hot flue gas, or other waste heat sources and passing it through the in-bed heat exchanger. An indirect heat supply involves use of water or other heat transfer liquid, which is heated by hot primary air stream, hot condenser cooling water, steam extracted from steam turbine cycle, hot flue gas, or other waste heat sources in an external heat exchanger before it is passed through the in-bed heat exchanger 101.

The bed volume can be unitary (see FIG. 3) or divided into several sections, referred to herein as "stages" (see FIGS. 2 and 5). A fluidized-bed dryer 100 is a good choice for drying wet coal to be burned at the same site where the coal is to be combusted. The multiple stages could be contained in a single vessel or multiple vessels. A multi-stage design allows maximum utilization of fluidized-bed mixing, segregation, and drying characteristics. The fluidized dryer bed 100 may include a direct or indirect heat source for drying the coal.

Referring now to FIGS. 2-4, the fluidized bed dryer 100 is shown as a multiple-stage single-vessel with a direct heat supply. While there are many different possible structural arrangements for fluidized-bed dryer 100, common functional elements include a vessel 102 for receiving and supporting coal for fluidization and transport. A distributor plate 104 forms a floor towards the bottom of the vessel 102 to support the non-fluidized coal or material. The distributor plate 104 generally divides the vessel 102 into a fluidized bed region 106 and a plenum region 108.

Figure 4A:
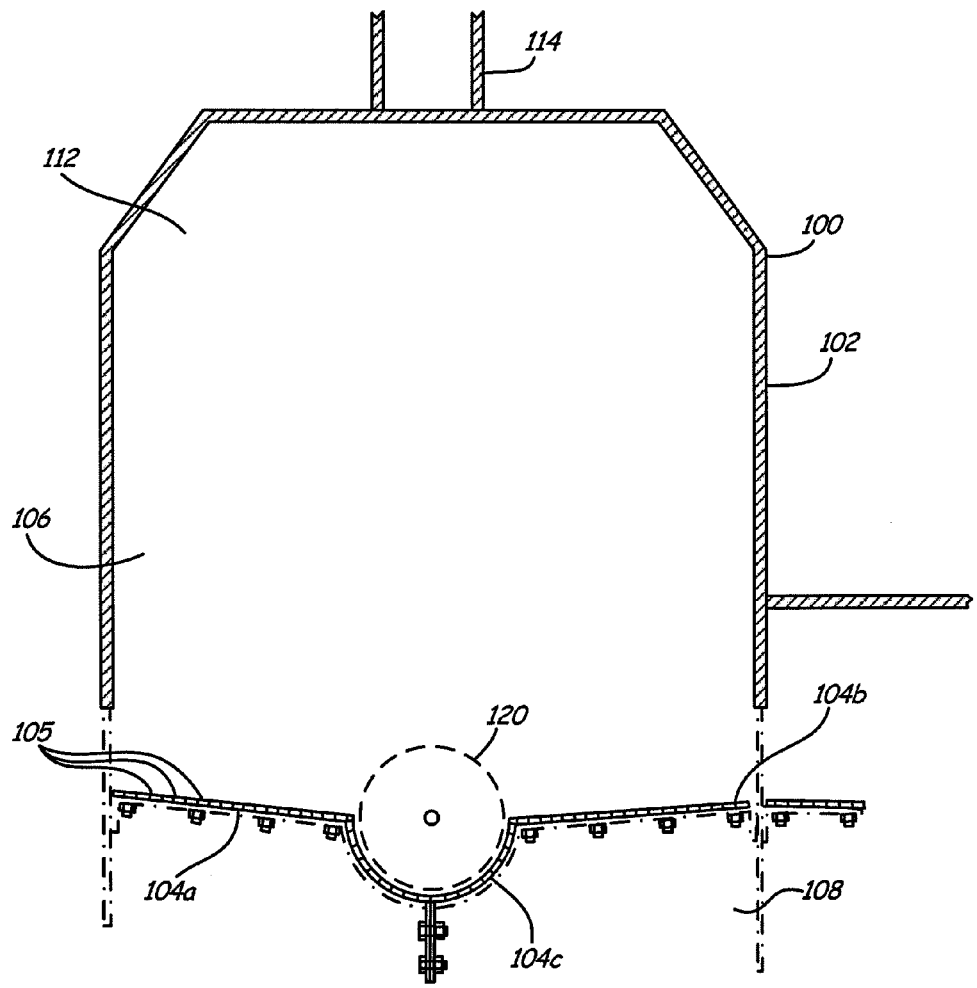
FIG. 4A is a cross section view of a fluidized bed having a distributor plate and conveyor.

Referring particularly to FIGS. 4A-4C, the vessel 102 may be a trough, closed container, or other suitable arrangement. The distributor plate 104 may be perforated or constructed with suitable valve means such as apertures or openings 105 to permit fluidizing air 110 (see FIGS. 4A-4C) to enter the plenum region 108 of vessel 102. The fluidizing air 110 is distributed throughout the plenum region 108 and forced through the openings or valves 105 in the distributor plate 104 at high pressure to fluidize the coal lying within the fluidized bed region 106.

In one example embodiment of the present invention, as particularly illustrated in FIG. 4A, distributor plate 104 includes first and second distributor plate portions 104a and 104b respectively. First distributor plate portion 104a and second distributor plate portion 104b are pitched, angled or slopped toward each other and toward a centrally located axis of fluidized dryer bed 100 to concentrate the non-fluidized material toward a center portion of the bed 102. Distributor plate 104 may also include an annular portion or channel portion 104c (see FIG. 4A) that extends generally into the plenum area 108 for receiving a conveyor 120 that moves or transports the non-fluidized material within the fluidized bed region 106.

Figure 6:
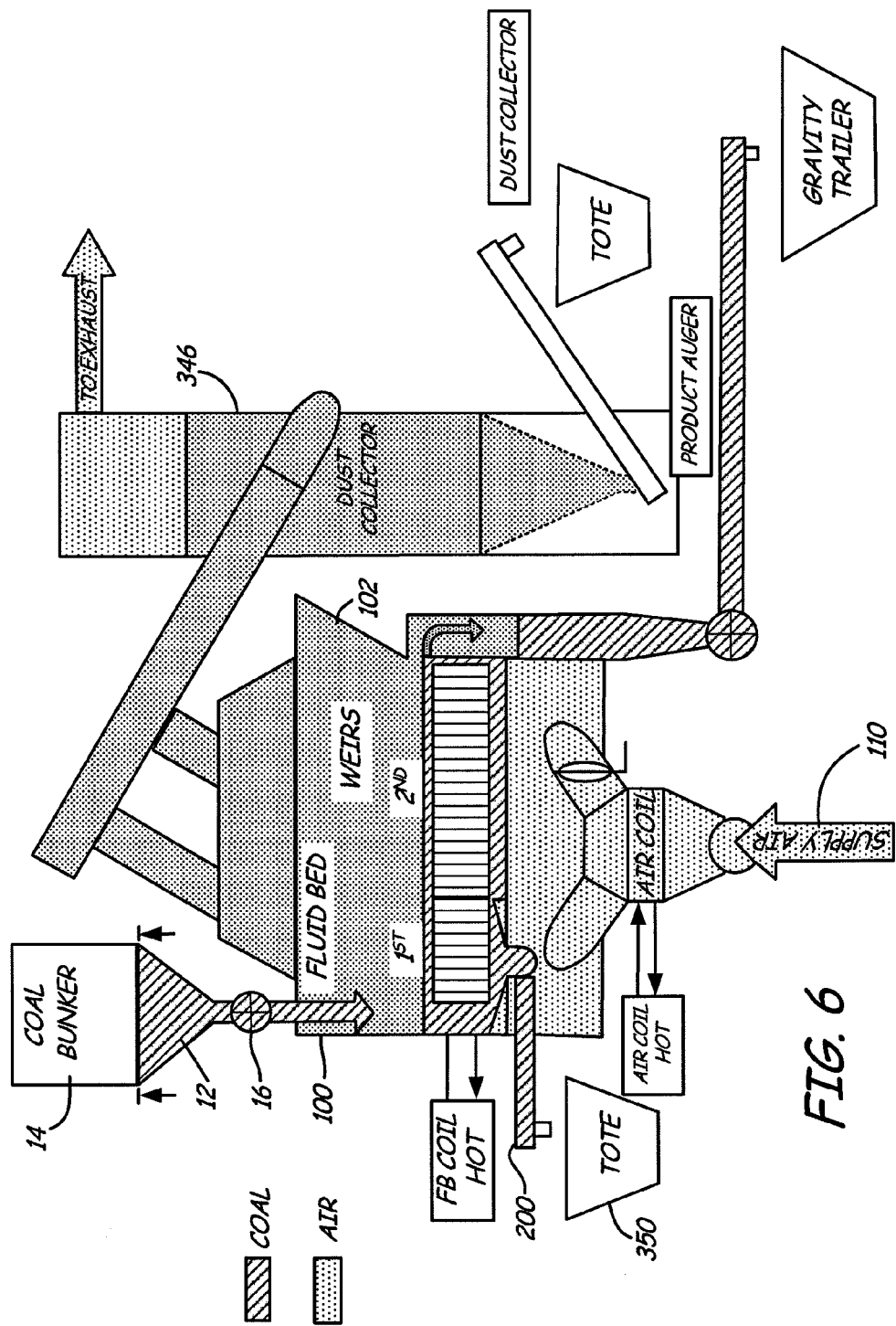
FIG. 6 is of the scrubber assembly operatively coupled to the fluidized bed dryer according to an example embodiment of the present invention.
Figure 7:
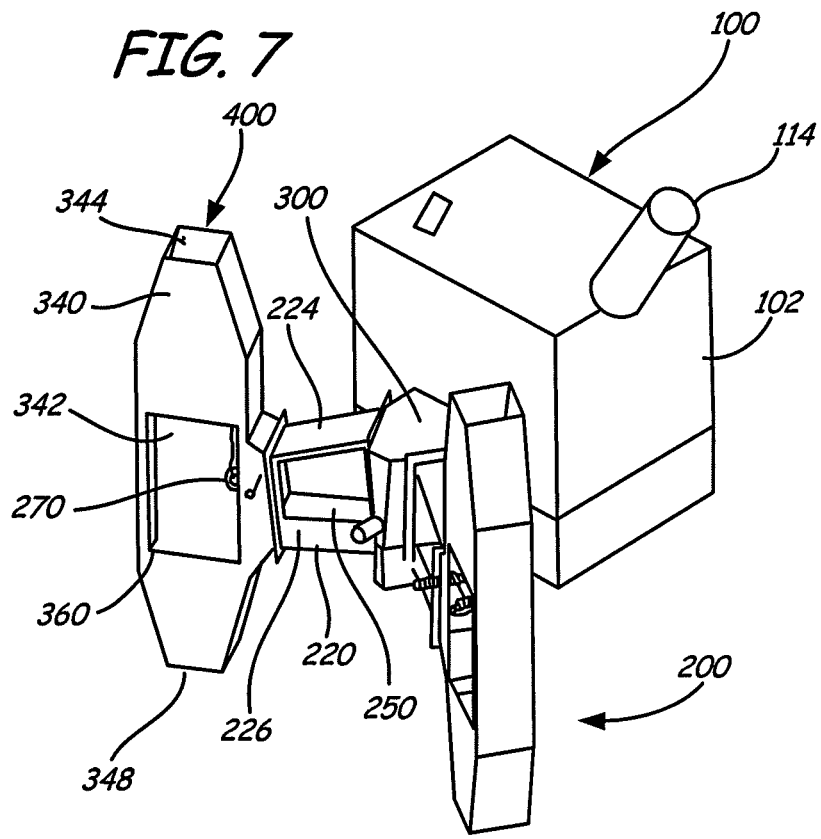
FIG. 7 is a perspective view of a scrubber assembly operatively coupled to a fluidized bed according to an example embodiment of the present invention.

An upper portion of the vessel 102 defines a freeboard region 112. Wet coal 12 enters the fluidized bed region 106 of fluidized-bed dryer 100 at entry point 114 as shown in FIGS. 3, 4A, and 6. When the wet coal 12 is fluidized by fluidizing air 110, the coal moisture and elutriated coal fines 116 are propelled through the freeboard region 112 of vessel 102 and exit typically at the top of fluidized-bed dryer 100, as illustrated in FIG. 3. Dried coal 120 exits the vessel 102 at discharge point 122. The structure and location of the coal inlet and outlet points, the elutriated fines outlet, the distributor plate 104, and configuration of the vessel 102 may be modified as desired for best results.

Still another embodiment of an open-air, low-temperature fluidized bed dryer design of the present invention is illustrated in FIG. 5, which is a multiple-stage, single-vessel, fluidized bed dryer 130 with a direct heat supply (hot condenser cooling water 172 from the cooling tower of electric power plant) to an in-bed heat exchanger 134. Vessel 102 is divided in two stages: a first stage 136 and second stage 138. Although illustrated in FIG. 5 as a two-stage dryer, additional stages may be added and further processing can be achieved. Typically, wet coal 12 enters the first stage 136 of the fluidized bed drier 130 through the freeboard region 112 at entry point 114. The wet coal 12 is preheated and partially dried (i.e., a portion of surface moisture is removed) by hot condenser cooling water 172 entering, circulating and exiting through the heating coils of in-bed heat exchanger 134 contained inside the first stage 136 (direct heat). The wet coal 12 is also heated and fluidized by hot fluidizing air 110. Fluidizing air 110 is forced by fan 127 through the distributor plate 104 of the first stage 136 of the fluidized bed dryer 130 after being heated by waste process heat 140 in external heat exchanger 142.

In the first stage 136, the hot fluidization air stream 110 is forced through the wet coal 12 supported by and above distributor plate 104 to dry the coal and separate the fluidizable material and non-fluidizable material contained within the coal. Larger and/or denser, non-fluidizable material segregate out due to having a higher specific gravity within the bed 130 and collect at its bottom on the distributor plate 104. These non-fluidizable material ("undercut") are then discharged from the first stage 136 as Stream 1 (176). Fluidized bed dryers are generally designed to handle non-fluidized material up to four inches thick collecting at the bottom of the fluidized bed. The non-fluidized material may account for up to 25% of the coal input stream. This undercut stream 176 can be directed through another beneficiation process or simply be rejected. In this particular embodiment, movement of the non-fluidized segregated material along the distributor plate 104 to the discharge point for stream 176 is accomplished by an inclined horizontal-directional oriented distributor plate 104, as shown back in FIG. 5. The first stage 136 therefore: separates the fluidizable and non-fluidizable material, predries and preheats the wet coal 12, and provides uniform flow of the fluidized wet coal 12 to the second stage 138 contained within the fluidized dryer bed 130. In another example embodiment of the invention, after the initial fluidization in the first stage 136 of the fluidized dryer bed 130, the non-fluidizable material or undercut may be generally horizontally transported within the fluidized dryer bed 130 for disposal or further process. Further processing may include further fluidization of the now partially dried coal in a second fluidizing or scrubber assembly 200. Scrubber assembly 200 continues the fluidization process by fluidizing and separating smaller fluidized particulate material that is still trapped or has become trapped in the denser and/or larger non-fluidizable material. The scrubber assembly 200 is a generally confined area with respect to vessel 102, which enables higher flow rates of the hot fluidizing air 110 to flow through the non-fluidized material. In addition to continuing the fluidization process, the scrubber assembly 200 also at least temporarily collects or concentrates the denser and/or larger non-fluidizable matter for discharging.

As illustrated in FIGS. 7-8 and 10-11, multiple scrubber assemblies may be needed to accommodate a large fluidized dryer bed 130 capable of drying large volumes of coal. The following description of the scrubber assembly 100 will be discussed in the singular, however it applies equally well to arrangements of multiple scrubber assemblies. Additionally, although scrubber assembly will be discussed in connection with a multiple-stage fluidized dryer bed 130, it is equally applicable to a single-staged fluidized dryer bed 130.

Referring to FIGS. 6-9, scrubber assembly 200 includes a fluidizing collector or collector box 220 to receive and process the non-fluidized material. The conveyor 120, which may comprise a screw auger, belt, ram, drag chain, or similar device, is operatively disposed in and generally extends between the fluidized dryer bed 130 and the fluidizing collector 220 to transport the non-fluidized material to fluidizing collector 220. Conveyor 120 may be disposed in the recessed or channel portion 104c of distributor plate 104 such that hot fluidizing air 110 surrounds and flow through at least a portion and preferably a majority of the non-fluidized material. Additionally, having the non-fluidized material entering the channel portion 104c of the distributor plate 104 permits the apertures 105 on the inclined surfaces of distributor plate 104 to remain generally open to dry and fluidize the fine particulate material. Once the non-fluidized material is transported to fluidizing collector 220 it begins to collect or concentrate behind a gate or other type of flow control 270 operatively coupled to fluidizing collector 220. Once a predetermined amount of non-fluidized material has been collected or a predetermined amount of time has elapsed, gate 270 may be opened discharging the non-fluidized material for disposal or further processing.

Referring to FIGS. 7-15, fluidizing collector 220 generally comprises a bottom wall 222, a top wall 224, and a peripheral wall 226 extending therebetween defining an interior 227 for receiving and fluidizing the non-fluidized material from the fluidized dryer bed 130 before it is discharged for disposal or further processing. Since fluidization will be occurring in the fluidizing collector 220 construction materials may be used that are able to withstand the pressures needed to separate the fine particulates from the denser and/or larger contaminated material. Such construction material can include steel, aluminum, iron, or an alloy having similar physical characteristics. However, other materials may also be used to manufacture the fluidizing collector 220.

Figure 8:
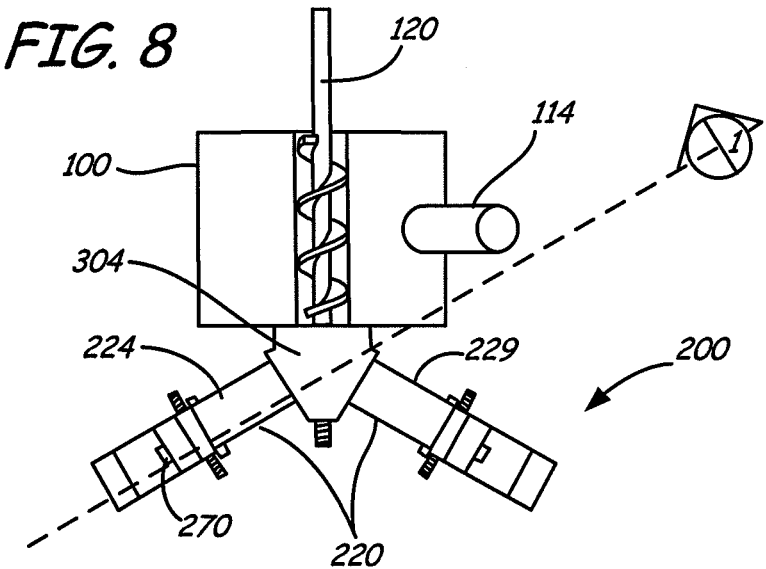
FIG. 8 is a top plan view of a conveyor operatively disposed in the fluidized bed according to an example embodiment of the present invention.

Referring to FIG. 8, conveyor 120 may extend along a width of the first stage 134 of the fluidized dryer bed 130. As particularly illustrated in FIGS. 9A-9C, at least one passage 232 extends through the fluidized bed 130 to permit the passage of the denser and/or larger contaminated material between from the fluidized bed 130 to the fluidizing collector 220. In a preferred embodiment, passage 232 is continuously open. However, in other example embodiments passage 232 can be selectively blocked by a door, gate, or similar closure not shown. Selective blocking of passage 232 may permit a power plant the option of selectively utilizing the scrubber assembly 200. A second passage 233 may also extend through the fluidized bed 130 to permit the passage of the fluidized particulate from the fluidizing collector 220 back to the fluidized bed 130. The second passage 233 may be disposed proximate to and generally above passage 232.

Figure 9A:
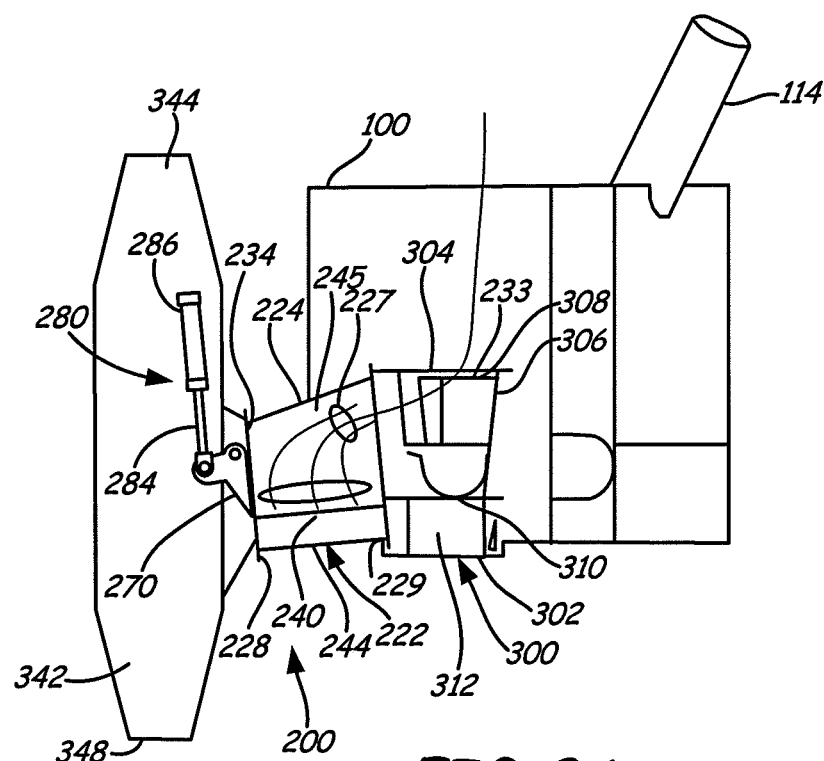
FIG. 9A is a partial cross section view of a scrubber assembly operatively coupled to a fluidized bed according to an example embodiment of the present invention.
Figure 9B:
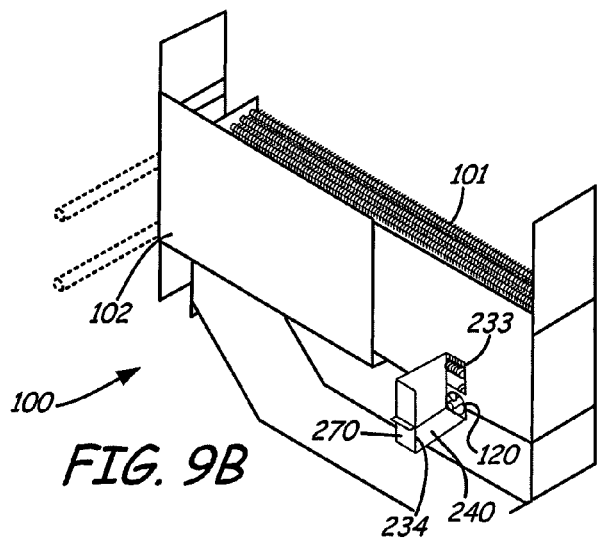
FIG. 9B is a partial cross section of a scrubber assembly operatively coupled to a fluidized bed according to an example embodiment of the present invention.
Figure 9C:
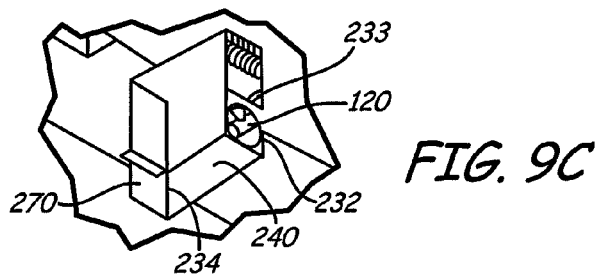
FIG. 9C is a partial enlarged view of FIG. 9B.
Figure 9D:
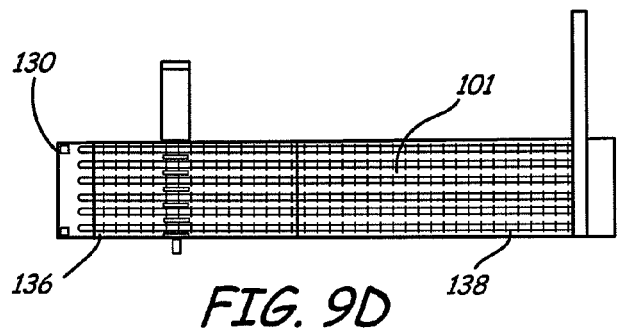
FIG. 9D is a top plan view of an in bed heat exchanger positioned in the fluidized bed.
Figure 9E:
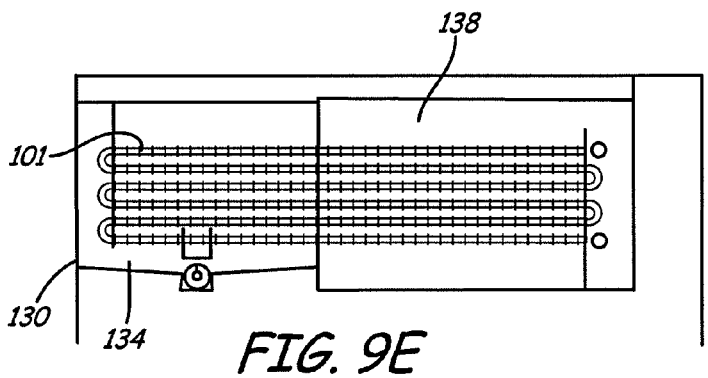
FIG. 9E is a cutaway view of the fluidized bed illustrating the in bed heat exchanger.

In an embodiment having only one fluidizing collector 220, as illustrated in FIGS. 9B and 9C, an outlet or discharge port 234 preferably extends through the second end wall portion 228 to permit the collected coal in the interior 227 of fluidizing collector 220 to discharge. In an example embodiment, discharge port 232 could be the same size or area as a width and/or height of the interior of the fluidizing collector 220 such that there is no lip or ledge to block the discharged coal.

Referring to FIGS. 9, 16-18, a gate, door, or similar closure 270 is operatively coupled to fluidizing collector 220 to selectively block or cover discharge port 234. Gate 270 causes coal in the interior of fluidizing collector 220 to collect or concentrate. At a predetermined time or interval gate 270 may be programmed to open allowing the coal to discharge. In an example embodiment of the invention, gate 270 is pivotally coupled to fluidizing collector 220. However, gate 270 may also be slidably disposed to the fluidizing collector 220. Other gate 270 configurations are also considered to be within the spirit and scope of the invention such as upwardly pivoting, downwardly pivoting, and/or laterally pivoting, and similar closures. Additionally, more than one gate (not shown) may be utilized to swing outwardly open to permit the discharge of the coal.

Figure 16:
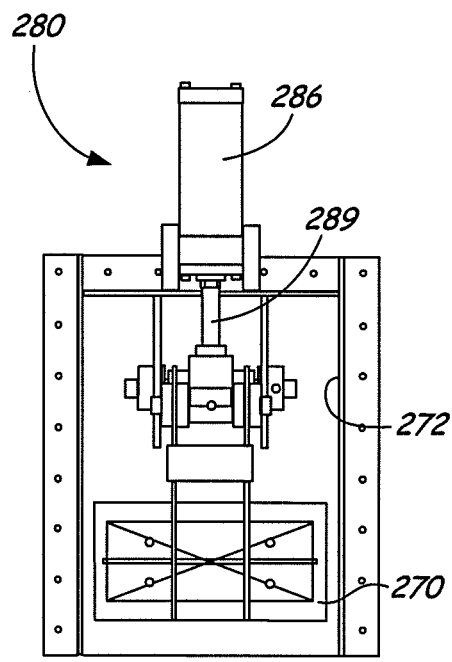
FIG. 16 is an end view of a gate or material flow regulator of a scrubber assembly according to an example embodiment of the present invention.
Figure 17:
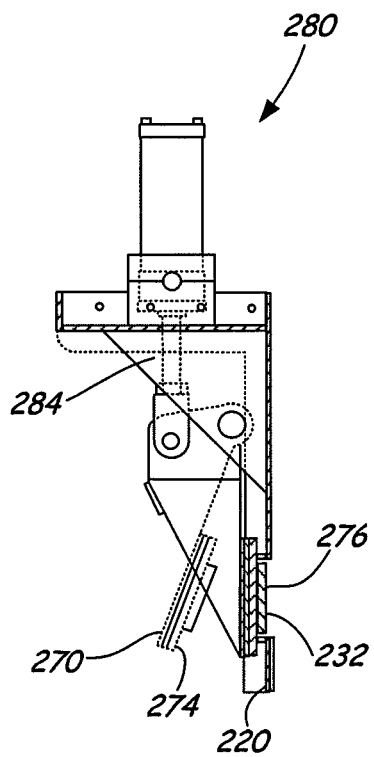
FIG. 17 is a cross section view of the gate according to an example embodiment of the present invention.

In an example embodiment, as illustrated in FIG. 16, gate 270 could include a planar door portion 272 that covers discharge port 232 of fluidizing collector 220. Door portion 272 may have an area greater than an area of discharge port 232. Door portion 272 may comprise any rigid material such as steel, aluminum, iron, and like materials with similar physical characteristics. In an alternate embodiment, gate 270 will be repeatedly operated, it may be advantageous to use a thinner material, which can reduce its weight. In this embodiment, the door portion 272 may also include bracing or supports (not shown) to add additional support against any outwardly acting pressure from within fluidizing collector 220.

Gate 270 also includes at least one seal portion 274 disposed on or to an inner surface of door portion 272 to form a generally positive seal over discharge opening 232. Seal portion 274 could have an area greater than an area of discharge opening 232. Seal member 274 could comprise any resiliently compressible material such as rubber, an elastic plastic, or like devices having similar physical characteristics.

A cover 276 may be disposed on seal member 272 to protect or cover it from the fluidized and non-fluidized material that will confronting seal gate 270. As particularly illustrated in FIG. 17, cover 276 comprises a sheet having an area that can be less than an area of discharge opening 232. When gate 270 is in its closed position cover 276 is nested in discharge port 232. Cover 276 can comprise any rigid material such as steel, aluminum, iron, and like materials with similar physical characteristics. However, other materials may also be utilized for cover 276.

In an example embodiment, an actuation assembly 280 is operatively coupled to gate 270 to move it from an open position and a closed position, whereby the coal is dischargable from fluidizing collector 220 when gate 270 is in the open position. Actuation assembly 280 comprises a pneumatic piston rod 284 and cylinder 286 that are in operative communication with a fluid pneumatic system (not shown). The fluid pneumatic system may include the utilization of fluid heat streams such as waste heat streams, primary heat streams, or a combination to the two.

To aid the fluidized particulate material to flow in the fluidized stream fluidizing collector 230 a fluidizing air stream such as any waste heat stream from the plant, any primary air streams or any combination thereof is introduced to the fluidizing collection 230 and coal to create a fluidized particulate material that is permitted to flow back into the fluidized bed 130.

Turning now to FIGS. 9A-9C, a distributor plate 240 is disposed in the interior of fluidizing collector 220 to define a plenum area 244 and a fluidizing area 245. As the coal passes through passage 232 it rests upon distributor plate 240. In an example embodiment, an inlet 246 is provided for receiving at least one fluid heat stream. A distributor plate 240, having a plurality of apertures or passages 242 extending therethrough, is disposed in a lower portion of the fluidizing collector 220 to diffuse a fluid stream through the coal. As particularly illustrated in FIGS. 12-14, the distributor plate 240 preferably slopes away from the fluidized bed 130 to permit gravitational forces draw the coal from the fluidized bed 130 toward the first end wall portion 227 of the fluidizing collector 220.

The apertures 242 extending through the distributor plate 240 may be oriented in a pattern such as a directional pattern to control a flow of the fluid heat stream toward a particular direction. For example, FIG. 9A illustrates a fluid heat stream flowing toward the first end wall portion 227 and then out through passage 232. Other configurations may include alternating, counter or cross oriented apertures such that the fluid heat stream entering the fluidizing collector 220 becomes turbulent or agitated. The agitated state would have the effect of drawing more fine particulate material into the fluidizing material. Still other configurations may include spiral, or cyclonic orientated apertures to create a funnel or vortex of the fine particulate material.

The fluidizing collector 220 can also, although not necessary, include an in-collector heater (not shown) that may be operatively coupled to a fluid heat stream to provide additional heat and drying of the coal. The in-collector heater may be fed by any fluid heat stream available in the power plant including primary heat streams, waste streams, and any combination there.

As illustrated in FIG. 9A, the top wall 224 of fluidizing collector 220 may traverse away from the fluidized bed 130 at an angle such that the fluid heat stream entering the fluidizing collector 220 is directed toward passage 232 or second passage 233 and into the fluidized bed 130. An inner surface of the top wall 224 can include impressions, or configurations such as channels, indentations, ridges, or similar arrangements that may facilitate the flow of the fluidized particulate matter through passage 232 or second passage 233 and into the fluidized bed 130.

Referring back to FIG. 7 and FIG. 15, a window assembly 250 may be disposed on the peripheral wall 226 to permit viewing of the fluidization occurring within the interior of the fluidizing collector 220. In an example embodiment of the present invention, the window assembly 250 comprises at least an inner window 252 comprising a transparent and/or shatter resistant material such as plastic, thermoplastic, and like materials fastened to and extending across a window opening 254. A support or plate 256 may be disposed to a perimeter outer surface of the inner window 252 to provide support against outwardly acting pressure against the inner window 252. The support 256 may comprise any substantially rigid material such as steel, aluminum, or like material. A second or outer widow 258 may be disposed to an outer surface of the support 256 to provide additional support against outwardly acting pressures within the fluidizing collector 220. A bracket 260 and fastener 262 may be utilized to secure window assembly 250 into place. Bracket 260 may comprise an L-shape, C-shape, or similar shape that is capable of securing the window assembly 250. Fastener 262 may comprise a bolt, screw, c-clamp, or any fastener known to one skilled in the art.

Referring to FIGS. 7-9A-9C, if multiple scrubber assemblies 200 are utilized a junction 300 may be operatively disposed between the scrubber assemblies 200 and fluidized dryer bed 130. As particularly illustrated in FIG. 7-9A, junction 300 comprises a bottom wall 302, a top wall 304 and a plurality of side walls 306 defining an interior 308. A distributor plate 310 is spaced a distance from the bottom wall 302 of junction 300 defining a plenum 312 for receiving at least one fluid heat stream that flows into the plenum 312 through at least one inlet 316. Distributor plate 312 of junction 300 is preferably sloped or angled toward fluidizing collector 220 to assist in the transport of non-fluidized material from the fluidized dryer bed 130. As the non-fluidized material travels through junction 300, apertures 314 extending through distributor plate 310 to diffuse a fluid heat stream through the non-fluidized material; thereby causing the separation of fine particulate material. The fine particulate material becomes fluidized and flows back into the interior 106 of fluidized dryer bed 130. The apertures 314 extending through distributor plate 310 of junction 300 may be angled during manufacturing to control a direction of the fluid heat stream.

When the non-fluidizing material reaches a predetermined limit (weight or volume) or a predetermined amount of time has elapsed (between openings), gate 270 opens permitting the non-fluidized material and accumulated fluid pressure to be discharged. As illustrated in FIGS. 7-9C, a chute 340 is operatively disposed to fluidizing collector 220 and about gate 270 such that gate 270 is disposed within an interior 342 of chute 340. Chute 340 includes a vent or opening 344 by which gas and residual particulate material from fluidizing collector 220 may escape. In one embodiment of the present invention, vent 344 is in fluid communication with a dust collector or bag house 346 that filters or collects the gas.

Chute 340 also includes a discharge port 348 opposed to and in fluid communication with vent 344. As the non-fluidized material is discharged from fluidizing collector 220 gravitational forces draw the material into a tote or container 350 to be transported for disposal or further processing. A conveyor belt or similar structure may also be utilized to catch and transport the non-fluidized material from scrubber assembly 200. The further processing may include disposing of the non-fluidized material. If the non-fluidized material is salvageable it may be processed through an air jig that can further separate contaminated material from non-contaminated material.

In one example embodiment of the invention, chute 340 may also include a door or access window 360 operatively disposed proximate gate 270 to permit an operator to view the discharging of the coal. Door 360 may be hingedly or slidably disposed to a portion of chute 340 such that an operator may open door 360 if chute 340 should become clogged or gate 270 is in need of repair.

Figure 10:
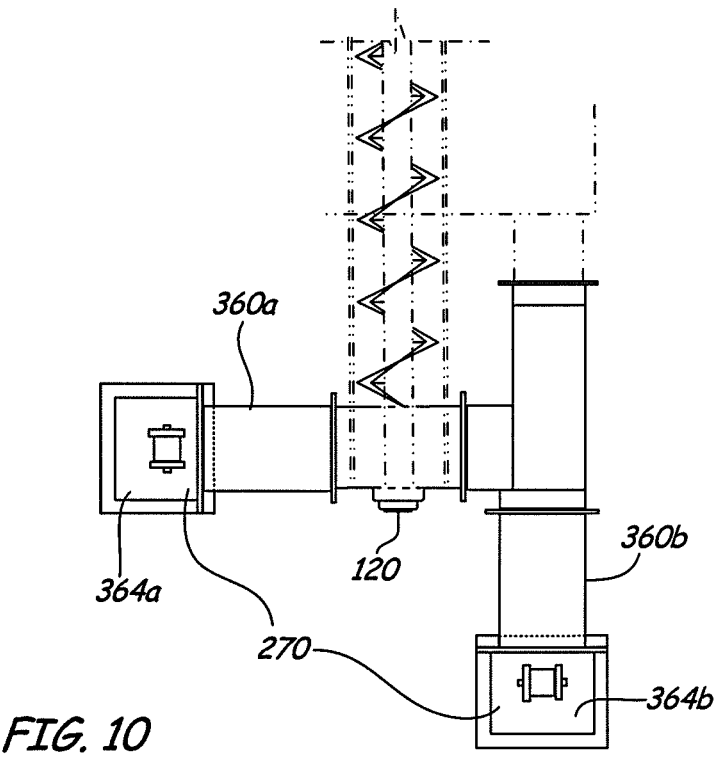
FIG. 10 is a top partial cross section view of an alternate embodiment of a scrubber assembly according to an example embodiment of the present invention.
Figure 11:
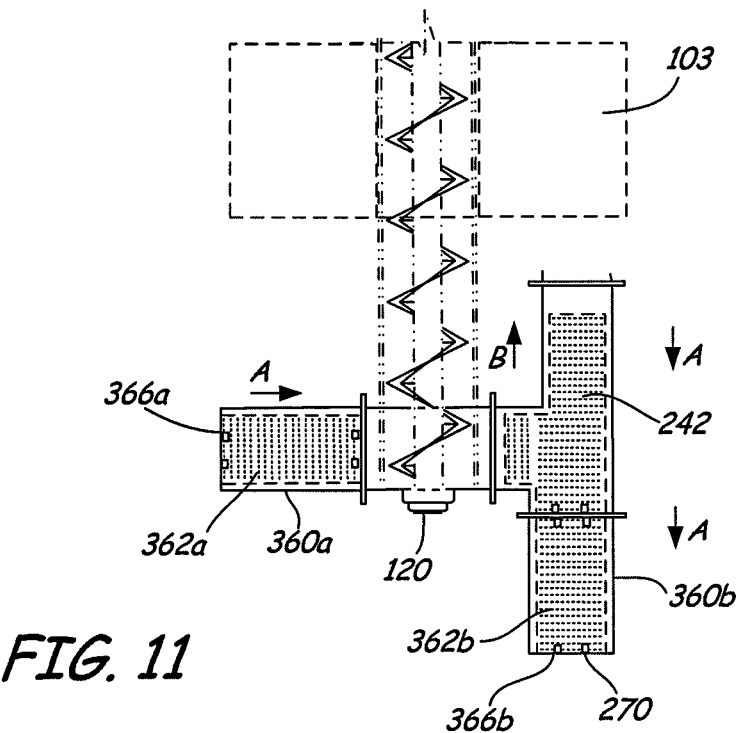
FIG. 11 is a top cross section view of an alternate embodiment of a scrubber assembly according to an example embodiment of the present invention.
Figure 12:
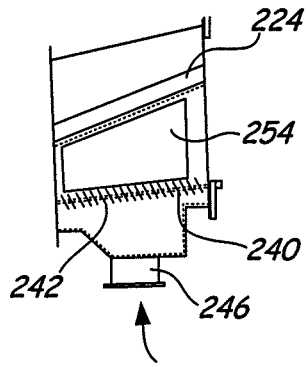
FIG. 12 is a cross section view of a fluidizing collector of a scrubber assembly according to an example embodiment of the present invention.
Figure 13:
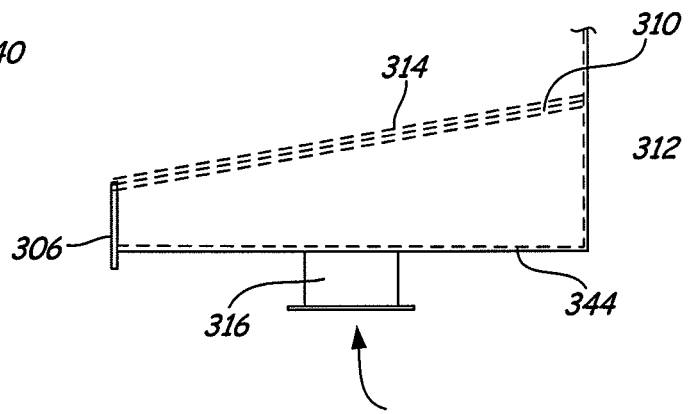
FIG. 13 is a cross section view of a junction of a scrubber assembly having two or more fluidizing collectors according to an example embodiment of the present invention.
Figure 14:
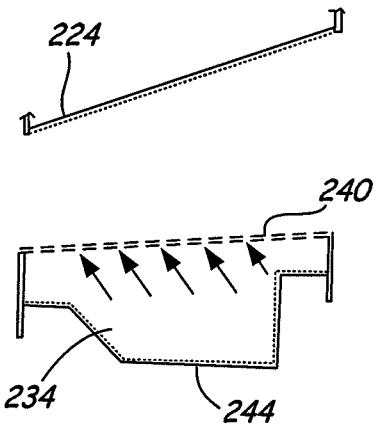
FIG. 14 is a cross section view of a fluidizing collector of a scrubber assembly according to an example embodiment of the present invention.
Figure 15:
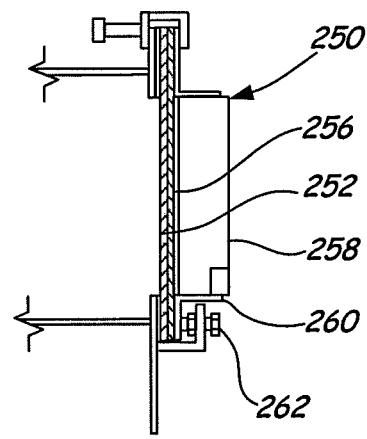
FIG. 15 is an example configuration of a window of a fluidizing collector according to an example embodiment of the present invention.

In another embodiment of the present invention, as particularly illustrated in FIGS. 10 and 11, multiple scrubber assemblies 360a and 360b are provided in a generally L-shaped configuration such that a long axis of each of the assemblies 360a and 360b are generally transverse to each other. Conveyor 120 is operatively coupled to scrubber assembly 360a. However it could also be operatively coupled to scrubber assembly 360b. Each of the scrubber assemblies 360a and 360b includes a fluidizing collector 362a and 263b respectively to collect and fluidize the non-fluidized material from the fluidized bed 130. Apertures extending through distributor plates 362a and 362b flow in the direction of the arrows indicated with the letter A and against gates 364a and 364b respectively blocking discharge ports 366a and 366b respectively. However, when gates 364a and 364b are in a closed position the passage open is back along the direction of arrow B. The fluidized particulate material flows in the direction of arrow B and mixes with the fluidized particulate material in the fluidized bed 103.

Distributor plates 362a and 362b are preferably sloped or angled toward gates 364a and 364b respectively to allow gravitational forces to aid in drawing the non-fluidized material into the fluidizing collectors 360a and 360b. Gates 364a and 364b are periodically opened to permit accumulated non-fluidized material to be discharged into a tote or onto a conveyor system for further processing. In one embodiment of the invention, gates 364a and 364b are opened only for very small duration of time. During the time they are opened a negative pressure is created in the fluidizing collectors 360a and 360b causing an outwardly directed airflow to push the non-fluidized material out of the collectors 360a and 360b. In an example embodiment, chutes (not shown) may also be operatively coupled to the fluidizing collectors 360a and 360b to direct a flow of non-fluidized material and a flow of air and/or air and particulate material out of the fluidizing collectors 360a and 360b.

In any of the embodiments having a scrubber assembly 220, as the fine particulate material flows into the fluidized dryer bed 130 it mixes with the other fine particulate material. Returning to FIGS. 3 and 5, from the first stage 136, the fluidized coal 12 flows airborne over a first weir 180 to the second stage 138 of the bed dryer 130. In this second stage of the bed dryer 130, the fluidized coal 12 is further heated and dried to a desired outlet moisture level by direct heat, hot condenser cooling water 132 entering, circulating, and exiting the heating coils of the in-bed heat exchanger 182 contained within the second stage 138 to radiate sensible heat therein. The coal 12 is also heated, dried, and fluidized by hot fluidizing air 110 forced by fan 127 through the distributor plate 104 into the second stage 138 of the fluidized bed dryer 130 after being heated by waste process heat 140 in external heat exchanger 142.

The dried coal stream is discharged airborne over a second weir 184 at the discharge end 122 of the fluidized bed dryer 130, and elutriated fines 116 and moist air are discharged through the top of the dryer unit. This second stage 138 can also be used to further separate fly ash and other impurities from the coal 12. Segregated material will be removed from the second stage 138 via multiple extraction points 186 and 188 located at the bottom of the bed 130 (or wherever else that is appropriate), as shown in FIG. 5 as Streams 2 (186) and 3 (188). The required number of extraction points may be modified depending upon the size and other properties of the wet coal 12, including without limitation, nature of the undesirable impurities, fluidization parameters, and bed design. The movement of the segregated material to the discharge point(s) 176, 186, and 188 can be accomplished by an inclined distributor plate 104, or by existing commercially available horizontal-directional distributor plates. Streams 1, 2 and 3 may be either removed from the process and land-filled or further processed to remove undesirable impurities.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

We claim:

1. An apparatus for segregating particulate material by density and/or size to concentrate a contaminant contained within part of the particulate material for separation from the rest of the particulate material, comprising:
   (a) an enclosed fluidizing bed having (i) a receiving inlet for receiving the particulate material; (ii) an inlet opening for receiving a fluidizing stream for fluidizing at least a portion of the particulate material to create without mechanically-applied oscillation a first fluidized particulate material stream, and a first non-fluidized particulate material stream containing an increased concentration of the contaminant relative to the particulate material; (iii) a discharge outlet for discharging a portion of the fluidizing stream containing elutriated fines from the particulate material feed; (iv) a discharge outlet for discharging the first fluidized particulate material stream; and (v) discharge outlet for discharging the first non-fluidized particulate material stream containing the increased concentration of the contaminant;
   (b) a collector box positioned to receive the first non-fluidized particulate material stream discharged from the fluidizing bed, the collector box including means for directing a second fluidizing stream through the first non-fluidized particulate material stream as it is transported through the collector box to fluidize at least a portion of the first non-fluidized particulate material stream to create without mechanically-applied oscillation (i) a second non-fluidized particulate material stream from the first non-fluidized particulate material stream containing a further increased concentration of the contaminant and (ii) a second fluidized particulate material stream containing elutriated fines from the first non-fluidized particulate material stream;
   (c) a first fluidizing stream operatively connected to the inlet opening of the fluidizing bed for introducing the first fluidizing stream into the fluidizing bed to achieve separation of the first fluidized particulate material stream from the first non-fluidized particulate material stream; and
   (d) a second fluidizing stream operatively connected to the collector box for introducing the second fluidizing stream into the collector box to achieve separation of the second non-fluidized particulate material stream from the first non-fluidized particulate material stream.

2. The particulate material segregating apparatus of claim 1, further comprising a conveyor for conveying the first non-fluidized particulate material stream inside the fluidizing bed.

3. The particulate material segregating apparatus of claim 1, including a heat source for heating the particulate material feed within the fluidizing bed.

4. The particulate material segregating apparatus of claim 3, wherein the heat source is a primary heat source.

5. The particulate material segregating apparatus of claim 3, wherein the heat source is a waste heat source.

6. The particulate material segregating apparatus of claim 5, wherein the waste heat source is selected from group consisting of hot condenser cooling water, hot stack gas, hot flue gas, spent process steam and discharged heat from operating equipment.

7. The particulate material segregating apparatus of claim 3, wherein the temperature delivered to the fluidizing bed by the heat means does not exceed 300° F.

8. The particulate material segregating apparatus of claim 3, wherein the temperature delivered to the fluidizing bed by the heat source means is between 200-300° F.

9. The particulate material segregating apparatus of claim 1, wherein the first fluidizing stream is air.

10. The particulate material segregating apparatus of claim 1 including a heat exchanger within the fluidized bed for heating the particulate material.

11. The particulate material segregating apparatus of claim 1, wherein the first fluidizing stream is an inert gas.

12. The particulate material segregating apparatus of claim 1, wherein the second fluidizing stream is air.

13. The particulate material segregating apparatus of claim 1, wherein the second fluidizing stream is steam.

14. The particulate material segregating apparatus of claim 1, wherein the second fluidizing stream is an inert gas.

15. The particulate material segregating apparatus of claim 1, wherein the particulate material is coal.

16. The particulate material segregating apparatus of claim 1, wherein the contaminant is selected from the group consisting of fly ash, sulfur, mercury, and ash.

17. The particulate material segregating apparatus of claim 1, wherein the second fluidized particulate material stream discharged from the collector box is transported back to the fluidizing bed for further processing.

18. The particulate material segregating apparatus of claim 1, wherein the second non-fluidized particulate material stream containing the enhanced concentration of the contaminant is further processed.

19. The particulate material segregating apparatus of claim 1, wherein the first fluidizing stream is heated by a heat emitting means.

20. The particulate material segregating apparatus of claim 19, wherein the heat emitting means is a heat exchanger.

21. The particulate material segregating apparatus of claim 19, wherein the heat emitting means is a primary heat source.

22. The particulate material segregating apparatus of claim 19, wherein the heat emitting means is a waste heat source.

23. The particulate material segregating apparatus of claim 22, wherein the waste heat source is selected from the group consisting of hot condenser cooling water, hot stack gas, hot flue gas, spent process steam, and discarded heat from operating equipment.

24. The particulate material segregating apparatus of claim 1, wherein the fluidizing bed contains a first-stage region and a second stage region, the first-stage region is separated from the second-stage region by means of weir gate over which the fluidized particulate material exiting the first-stage region enters the second-stage region, and further comprising a third fluidizing stream operatively connected to the second-stage region of the fluidizing bed to achieve further separation without mechanically-applied oscillation of the fluidized particulate material stream from the non-fluidized particulate material stream.

25. The particulate material segregating apparatus of claim 24, wherein the non-fluidized particulate material stream discharged from both the first-stage region and the second-stage region of the fluidizing bed are transported to the collector box for further processing.

26. The apparatus of claim 1, wherein the second fluidized particulate material stream is combined with the first fluidized particulate material stream from the fluidized bed.

27. The apparatus of claim 1, wherein the second fluidized particulate material stream is directed into the fluidizing bed where it is combined with the first fluidized particulate material stream.

28. The apparatus of claim 1, wherein the collector box includes a chute for directing the flow of the second fluidized particulate material stream from the collector box.

29. The apparatus of claim 1, wherein the first fluidizing stream is heated.

30. The apparatus of claim 1, wherein the first fluidizing stream is heated by waste heat.

31. The apparatus of claim 1, wherein the second fluidizing stream is heated.

32. The apparatus of claim 1, wherein the second fluidizing stream is heated by waste heat.

33. The apparatus of claim 1, wherein there are a plurality of collector boxes positioned to receive the first non-fluidized particulate material stream from the fluidizing bed.

* * * * *